US 11,474,280 B2

(12) United States Patent
Ogawa et al.

(10) Patent No.: US 11,474,280 B2
(45) Date of Patent: *Oct. 18, 2022

(54) POLYMERIZABLE COMPOSITION FOR OPTICAL MATERIAL AND OPTICAL MATERIAL AND PLASTIC LENS OBTAINED FROM SAME COMPOSITION

(71) Applicant: Mitsui Chemicals, Inc., Tokyo (JP)

(72) Inventors: Tatsuya Ogawa, Omuta (JP); Masayuki Furuya, Arao (JP); Shinsuke Ito, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 564 days.

This patent is subject to a terminal disclaimer.

(21) Appl. No.: 16/486,288

(22) PCT Filed: Feb. 21, 2018

(86) PCT No.: PCT/JP2018/006152
§ 371 (c)(1),
(2) Date: Aug. 15, 2019

(87) PCT Pub. No.: WO2018/155475
PCT Pub. Date: Aug. 30, 2018

(65) Prior Publication Data
US 2020/0233117 A1 Jul. 23, 2020

(30) Foreign Application Priority Data

Feb. 21, 2017 (JP) .............................. JP2017-030270
Jun. 16, 2017 (JP) .............................. JP2017-118598

(51) Int. Cl.
G02B 1/04 (2006.01)
C08L 31/06 (2006.01)
C08K 5/00 (2006.01)
B29D 11/00 (2006.01)
B29K 67/00 (2006.01)

(52) U.S. Cl.
CPC .............. *G02B 1/041* (2013.01); *C08L 31/06* (2013.01); *B29D 11/00009* (2013.01); *B29K 2067/04* (2013.01)

(58) Field of Classification Search
CPC ....... G02B 1/041; C08L 31/06; C08K 5/0091; C08K 5/08; C08K 5/23; C08K 5/132; C08K 5/235; C08K 5/3475; C08F 2/44
See application file for complete search history.

(56) References Cited

U.S. PATENT DOCUMENTS

| 4,590,248 | A | * | 5/1986 | Moriya ................. G02B 1/14 526/228 |
| 5,221,724 | A | * | 6/1993 | Li ..................... A61L 33/068 525/453 |
| 5,599,876 | A | | 2/1997 | Renzi et al. |
| 5,949,518 | A | * | 9/1999 | Belmares ............... C09D 5/32 351/159.57 |

(Continued)

FOREIGN PATENT DOCUMENTS

JP S60245607 A 12/1985
JP H72938 A 1/1995

(Continued)

OTHER PUBLICATIONS

International Search Report (PCT/ISA/210) dated May 15, 2018, by the Japanese Patent Office as the International Searching Authority for International Application No. PCT/JP2018/006152.

(Continued)

Primary Examiner — Bijan Ahvazi
(74) Attorney, Agent, or Firm — Buchanan Ingersoll & Rooney PC

(57) ABSTRACT

The polymerizable composition for an optical material of the present invention includes a compound (A) represented by General Formula (a) and including two or more allyloxycarbonyl groups, at least one kind of radical polymerization initiator (B) selected from the group consisting of a peroxyketal-based radical polymerization initiator, a peroxymonocarbonate-based radical polymerization initiator, and a peroxyester-based radical polymerization initiator, and a modifier (C) selected from a polyether modified siloxane compound represented by General Formula (c1) or a polyol compound represented by General Formula (c2).

17 Claims, No Drawings

(56) References Cited

U.S. PATENT DOCUMENTS

| | | | |
|---|---|---|---|
| 6,056,900 A | 5/2000 | Shimizu et al. | |
| 6,187,888 B1 | 2/2001 | Shimizu et al. | |
| 6,316,577 B1 * | 11/2001 | Shimada | G03G 5/0764 528/196 |
| 6,423,803 B1 | 7/2002 | Nagpal et al. | |
| 6,686,401 B1 | 2/2004 | Renzi et al. | |
| 7,214,954 B2 * | 5/2007 | Schopp | G01B 11/04 702/155 |
| 9,840,595 B2 | 12/2017 | Tapsak | |
| 10,723,862 B2 * | 7/2020 | Ogawa | C08K 5/08 |
| 2015/0203635 A1 | 7/2015 | Tapsak | |
| 2018/0022860 A1 | 1/2018 | Ito et al. | |
| 2018/0265674 A1 | 9/2018 | Ogawa et al. | |
| 2019/0153131 A1 | 5/2019 | Ogawa et al. | |

FOREIGN PATENT DOCUMENTS

| | | | |
|---|---|---|---|
| JP | H10186291 A | 7/1998 | |
| JP | H1177841 A | 3/1999 | |
| JP | 2003073405 A | 3/2003 | |
| JP | 2003517064 A | 5/2003 | |
| JP | 2005266794 A * | 9/2005 | C08F 18/18 |
| JP | 2005266794 A | 9/2005 | |
| JP | 2009019157 A | 1/2009 | |
| WO | 0031584 A2 | 6/2000 | |
| WO | 0116194 A1 | 3/2001 | |
| WO | 0233447 A1 | 4/2002 | |
| WO | 2016125786 A1 | 8/2016 | |
| WO | 2017047743 A1 | 3/2017 | |
| WO | 2017090725 A1 | 6/2017 | |

OTHER PUBLICATIONS

Knels et al., "Blue light stress in retinal neuronal (R28) cells is dependent on wavelength Yange and irradiance", European Journal of Neuroscience, vol. 34, Iss. 4, 2011, pp. 548-558.

* cited by examiner even when irradiated with the same amount, and show that suppression of exposure of light having a wavelength of 400 to 420 nm is important for eye disorder prevention.
POLYMERIZABLE COMPOSITION FOR OPTICAL MATERIAL AND OPTICAL MATERIAL AND PLASTIC LENS OBTAINED FROM SAME COMPOSITION

TECHNICAL FIELD

The present invention relates to a polymerizable composition for an optical material including an ultraviolet absorber and to an optical material and a plastic lens obtained from the same composition.

BACKGROUND ART

In comparison with inorganic lenses, plastic lenses have a higher refractive index and a higher Abbe number, are lighter and harder to break, and are able to be dyed and have thus rapidly become widespread in optical materials such as spectacle lenses and camera lenses. Various molded products for lenses have been developed and used up to now.

Among these, representative examples include allyl resins obtained from diethylene glycol bisallyl carbonate and diallyl isophthalate, (meth)acrylic resins obtained from (meth) acrylate, and polythiourethane resins obtained from isocyanate and thiols.

It is known that, in lenses made of allyl resin, the occurrence of cracks during polymerization and breaking during releasing may be observed depending on the polymerization catalyst to be used.

Patent Document 1 discloses a composition including diethylene glycol bisallyl carbonate, diisopropyl peroxydicarbonate, and a predetermined block copolymer in the Examples. Here, Patent Document 1 exemplifies organic peroxide compounds other than diisopropyl peroxydicarbonate, but does not disclose a specific example in which a lens is prepared using the compound.

In addition, in recent years, advances have been made in the development of plastic lenses having a function of cutting off ultraviolet (UV) light.

In the related art, adverse effects due to exposure of the eyes to ultraviolet light are regarded as a problem. Furthermore, in recent years, the blue light included in natural light or the light emitted from liquid crystal displays of office equipment, displays of portable equipment such as smartphones or mobile phones, and the like has had an influence on the eyes, causing problems such as feelings of eye fatigue and pain and there is a demand to reduce the amount of exposure of the eyes to light from ultraviolet light to blue light having a relatively short wavelength of approximately 420 nm.

Non-Patent Document 1 describes the influence of short wavelength blue light of approximately 420 nm on the eyes.

In Non-Patent Document 1, damage to retinal nerve cells (cultured retinal nerve R28 cells of rats) caused by irradiation with blue light emitting diode (LED) light having different peak wavelengths at 411 nm and 470 nm is verified. The results show that irradiation (4.5 W/m$^2$) with blue light having a peak wavelength at 411 nm causes the cell death of retinal nerve cells within 24 hours, whereas, for blue light having a peak wavelength at 470 nm, changes do not occur in cells even when irradiated with the same amount, and show that suppression of exposure of light having a wavelength of 400 to 420 nm is important for eye disorder prevention.

In addition, there is a concern that exposure of the eyes to blue light radiation for a long time will result in eye fatigue and stress and this is considered to be a factor causing age-related macular deoccurence.

Patent Document 2 discloses a plastic lens including an ultraviolet absorber having an average light transmittance of 0.5% or less in a wavelength range of 300 nm or more and 400 nm or less.

Patent Document 3 discloses a process for producing a diethylene glycol bisallyl carbonate polymer in which a benzophenone-based ultraviolet absorber is added to a diethylene glycol bisallyl carbonate polymer in such an amount or more that the light transmittance at a wavelength of 380 nm is 0% and a light transmittance at a wavelength of 440 nm is 90%, and obtain a composition is performed radical polymerization.

Patent Document 4 discloses a polymerizable composition including a polymerizable allyl carbonate, a photochromic compound and an ultraviolet absorber and the ultraviolet absorber is included in an amount not exceeding 1 part by weight with respect to 100 parts by weight of polymerizable allyl carbonate. Furthermore, Patent Document 4 discloses that the polymerizable allyl carbonate may include bis(allyl carbonate) of a monomer of diethylene glycol or a mixture of a monomer and oligomer, bis(allyl carbonate) of a monomer of neopentyl glycol or a mixture of a monomer and oligomer, tetrakis(allyl carbonate) of pentaerythritol, or the like.

Patent Document 5 discloses that a polymerizable composition obtained by carrying out a transesterification reaction on a mixture of diallyl carbonate and a phthalic acid ester with one or more linear type or side chain type polyols including 2 to 8 carbon atoms may include an ultraviolet absorber.

Patent Document 6 discloses a polymerizable composition which includes predetermined amounts of an allyl ester compound, a bis(allyl carbonate) compound, an organic peroxide, and an organic dye, and describes that an ultraviolet absorber may be further included. In the Examples, Macrolex Blue RR and Solvaperm Red BB are used as organic dyes.

Patent Document 7 discloses a polymerizable composition for an optical material including a compound including two or more allyloxycarbonyl groups, a predetermined ultraviolet absorber, a radical polymerization initiator, and a dye.

Patent Document 8 discloses a polymerizable composition including a specific polymerizable compound and a polyether-modified silicone compound, and describes that dyeing defects are improved in a molded product obtained from the composition. Patent Document 9 discloses a polymerizable composition including a specific polymerizable compound and a polyether-modified silicone compound, and describes that striae are improved in a molded product obtained from the composition.

RELATED DOCUMENT

Patent Document

[Patent Document 1] Published Japanese Translation of PCT International Application No. 2003-517064
[Patent Document 2] Japanese Laid-open Patent Publication No. 10-186291
[Patent Document 3] Japanese Laid-open Patent Publication No. 60-245607
[Patent Document 4] Japanese Laid-open Patent Publication No. 7-2938
[Patent Document 5] International Publication No. 2001/16194

[Patent Document 6] International Publication No. 2000/31584

[Patent Document 7] International Publication No. 2017/090725

[Patent Document 8] Japanese Laid-Open Patent Publication No. 11-77841

[Patent Document 9] International Publication No. 2016/125786

Non-Patent Document

[Non-Patent Document 1] The European journal of neuroscience, vol. 34, Iss. 4, 548-58, 2011

SUMMARY OF INVENTION

Technical Problem

However, the techniques described in these patent documents have room for improvement in the following points.

Since diisopropyl peroxydicarbonate, which is a catalyst used in the Examples of Patent Document 1, has problems in terms of the stability during storage and safety in manufacturing lenses using diisopropyl peroxydicarbonate, there is a desire to avoid using the compound. On the other hand, in a case where a catalyst other than the compound was used, although the above points were improved, there were cases where the occurrence of cracks during polymerization and breaking during releasing were observed.

In addition, in the polymerizable compositions described in Patent Documents 1 to 9, there were cases where cracks were occurred during polymerization or breaking occurred during releasing.

Solution to Problem

As a result of studies to solve the problems of the related art, the present inventors found that using a combination of specific components suppresses the occurrence of cracks during polymerization and breaking during releasing while maintaining good transparency and that the productivity was excellent.

That is, it is possible to illustrate the present invention as follows.

[1] A polymerizable composition for an optical material, comprising:

a compound (A) represented by General Formula (a) and including two or more allyloxycarbonyl groups;

at least one kind of radical polymerization initiator (B) selected from the group consisting of a peroxyketal-based radical polymerization initiator, a peroxymonocarbonate-based radical polymerization initiator, and a peroxyester-based radical polymerization initiator; and a modifier (C) selected from a polyether modified siloxane compound represented by General Formula (c1) or a polyol compound represented by General Formula (c2),

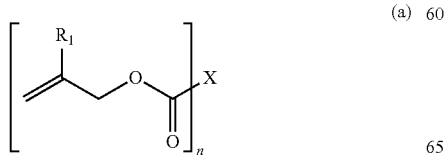

(a)

wherein in General Formula (a), n represents an integer of 2 to 6, $R_1$ represents a hydrogen atom or a methyl group, a plurality of present $R_1$'s may be the same or different, X is a divalent to hexavalent organic group a derived from a linear or branched aliphatic polyol having 3 to 12 carbon atoms which optionally have an oxygen atom, a divalent to hexavalent organic group b derived from an alicyclic polyol having 5 to 16 carbon atoms which optionally have an oxygen atom, or a divalent to hexavalent organic group c derived from an aromatic compound having 6 to 12 carbon atoms, and the organic group a or the organic group b forms an allyl carbonate group by bonding to an allyloxycarbonyl group via an oxygen atom derived from a hydroxyl group provided in these groups,

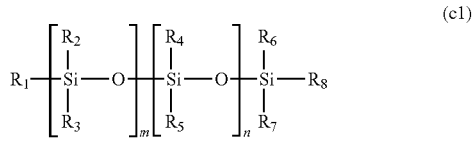

(c1)

wherein in General Formula (c1), $R_1$ to $R_8$ may be the same or different, and at least one of $R_1$ to $R_8$ represents a polyether group represented by General Formula (c1a), and other $R_1$ to $R_8$ may be the same or different and represent a linear or branched alkyl group having 1 to 20 carbon atoms, a linear or branched alkoxy group having 1 to 20 carbon atoms, a hydroxyl group, or a polysiloxy group, the plurality of present $R_2$ to $R_5$ may be the same as each other or different, m and n may be the same or different and represent an integer of 0 or more,

(c1a)

wherein in General Formula (c1a), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms, a plurality of present $R_{25}$'s may be the same or different, k represents an integer of 1 or more, and

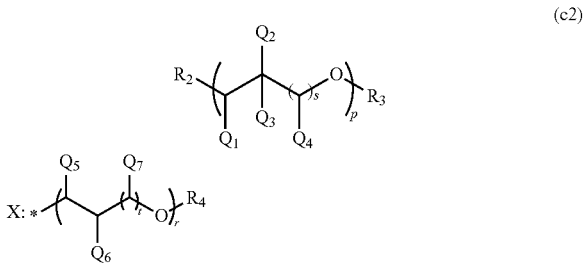

(c2)

wherein in General Formula (c2), $R_2$ represents a hydroxyl group, an —OX group, or a linear or branched alkyl group having 1 to 4 carbon atoms. $R_3$ represents a hydrogen atom, an X group, or a linear or branched alkyl group having 1 to 4 carbon atoms, $R_4$ represents a hydrogen atom or a linear or branched alkyl group having 1 to 4 carbon atoms, $Q_1$ to $Q_7$ each independently represent a hydrogen atom, a linear or branched alkyl group having 1 to 4 carbon atoms, a —CH$_2$—OX group, or an —OX group, p represents an integer of 1 to 4, s represents an integer of 0 to 4, t represents an integer of 0 to 4, and r represents an integer of 1 to 1,000, a plurality of present $Q_1$ to $Q_7$, X, s, and t may be the same or different, and * represents a bonding hand.

[2] The polymerizable composition for an optical material according to [1], further comprising:

an ultraviolet absorber (D) represented by General Formula (d),

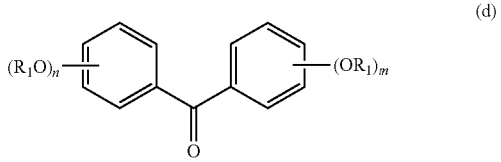

wherein in General Formula (d), $R_1$ represents a hydrogen atom or a linear or branched alkyl group having 1 to 20 carbon atoms, a plurality of present $R_1$'s may be the same or different, m represents an integer of 1 to 3, n represents an integer of 1 to 3, and the sum of m and n represents an integer of 3 to 6.

[3] The polymerizable composition for an optical material according to [1] or [2], further comprising:

at least one kind of dye (E) selected from an anthraquinone-based dye, a perinone-based dye, a monoazo-based dye, a diazo-based dye, and a phthalocyanine-based dye.

[4] The polymerizable composition for an optical material according to any one of [1] to [3], wherein the compound (A) including two or more allyloxycarbonyl groups includes an allyl carbonate polymerizable compound (A1) represented by General Formula (a1) and an oligomer thereof, an allyl ester polymerizable compound (A2) represented by General Formula (a2-1) or (a2-2) and an oligomer thereof, or a polymerizable compound (A3) represented by General Formula (a3) and including at least one of an allyl ester group and an allyl carbonate group and an oligomer thereof,

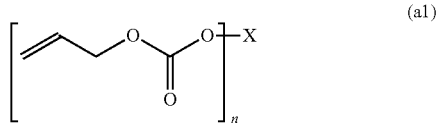

wherein in General Formula (a1), X represents a divalent to hexavalent group derived from a linear or branched aliphatic polyol having 3 to 12 carbon atoms or a divalent to hexavalent group derived from an alicyclic polyol having 5 to 16 carbon atoms, and n represents an integer of 2 to 6,

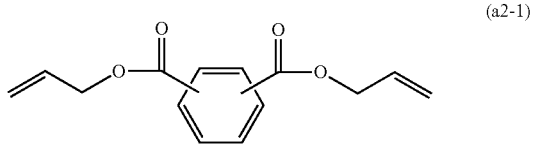

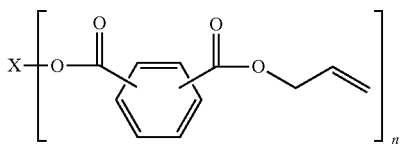

wherein in General Formula (a2-2), X represents a divalent group derived from a linear or branched aliphatic diol having 2 to 8 carbon atoms, a trivalent to hexavalent group derived from a linear or branched aliphatic polyol having 3 to 10 carbon atoms and having 3 to 6 hydroxyl groups, and n represents an integer of 2 to 6, and

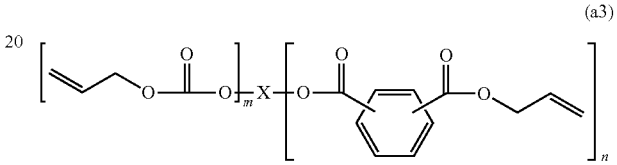

wherein in General Formula (a3), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, m and n represent integers of 0 to 6, and a sum of m and n represents an integer of 2 to 6.

[5] The polymerizable composition for an optical material according to [4], wherein the allyl carbonate polymerizable compound (A1) includes at least one kind selected from a bis(allyl carbonate) compound of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$] tricyclodecane, a tris(allyl carbonate) compound of at least one kind of triol selected from glycerol, trimethylolpropane, and tris(hydroxyethyl) isocyanurate, a tetra(allyl carbonate) compound of at least one kind of tetraol selected from pentaerythritol, diglycerol, and ditrimethylol propane, a dipentaerythritol hexa(allyl carbonate) compound, and a mixed poly(allyl carbonate) compound of at least two kinds of compounds selected from the diols, the triols, the tetraols, and the dipentaerythritol.

[6] The polymerizable composition for an optical material according to [4], wherein the allyl carbonate polymerizable compound (A1) includes at least one kind selected from (i) a mixture of a diethylene glycol bis(allyl carbonate) compound and an oligomer thereof, (ii) a mixture of a bis(allyl carbonate) compound of a mixture of diethylene glycol and neopentyl glycol and an oligomer thereof, (iii) a mixture of a poly(allyl carbonate) compound of a mixture of diethylene glycol and tris(hydroxyethyl) isocyanurate and an oligomer thereof, (iv) a mixture of a poly(allyl carbonate) compound of a mixture of diethylene glycol and trimethylolpropane and an oligomer thereof, (v) a mixture of a poly(allyl carbonate) compound of a mixture of diethylene glycol and pentaerythritol and an oligomer thereof, (vi) a mixture of a poly(allyl carbonate) compound of a mixture of diethylene glycol, neopentyl glycol and pentaerythritol and an oligomer thereof, and (vii) a poly(allyl carbonate) mixture comprising a mixture of a poly(allyl carbonate) compound of a mixture of diethylene glycol, neopentyl glycol, and pentaerythritol and an oligomer thereof, and a mixture of a diethylene glycol bis(allyl carbonate) compound and an oligomer thereof.

[7] The polymerizable composition for an optical material according to [4], wherein the allyl ester polymerizable compound (A2) or the polymerizable compound (A3) includes at least one kind selected from a diallyl phthalate compound selected from diallyl isophthalate, diallyl terephthalate and diallyl orthophthalate, a diallyl ester compound obtained by transesterification reaction of the diallyl phthalate compound and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane, and an oligomer thereof, a polyallyl ester compound obtained by transesterification reaction of the diallyl phthalate compound and a mixture of at least one kind of polyol selected from glycerol, trimethylolpropane, tris(hydroxyethyl)isocyanurate, pentaerythritol, diglycerol, ditrimethylolpropane, and dipentaerythritol, and an oligomer thereof, and an allyl ester compound, an allyl carbonate compound, and a compound having an allyl carbonate group and an allyl ester group, obtained by transesterification reaction of a mixture of at least one kind of dialkyl phthalate selected from dialkyl isophthalate, dialkyl terephthalate having an alkyl group having 1 to 3 carbon atoms, dialkyl terephthalate, and dialkyl orthophthalate, allyl alcohol, diallyl carbonate, and the diols or the polyols, and oligomers thereof.

[8] The polymerizable composition for an optical material according to [4], wherein the allyl ester polymerizable compound (A2) or the polymerizable compound (A3) includes at least one kind selected from (i) a mixture of diallyl terephthalate and a diethylene glycol bis(allyl carbonate) compound at 30% by weight with respect to the diallyl terephthalate and an oligomer thereof, (ii) an allyl ester compound obtained by transesterification reaction of a mixture of diallyl terephthalate and propylene glycol, (iii) a mixture of the allyl ester compound of (ii) and a diethylene glycol bis(allyl carbonate) compound at 20% by weight with respect to the allyl ester compound and an oligomer thereof, (iv) a mixture of an allyl ester compound, an allyl carbonate compound, and a compound having an allyl ester group and an allyl carbonate group, obtained by transesterification reaction of a mixture of dimethyl terephthalate, allyl alcohol, diallyl carbonate, and diethylene glycol, and (v) a mixture of the mixture obtained in (iv) and a diethylene glycol bis(allyl carbonate) compound at 10% by weight with respect to the mixture and an oligomer thereof.

[9] The polymerizable composition for an optical material according to [4], wherein the compound (A) including two or more allyloxycarbonyl groups is a mixture of the allyl ester polymerizable compound (A2) and/or the polymerizable compound (A3) according to [7] and oligomers thereof, and the allyl carbonate polymerizable compound (A1) according to [5] and an oligomer thereof.

[10] The polymerizable composition for an optical material according to [2], wherein the ultraviolet absorber (D) is 2,2'-dihydroxy-4-methoxybenzophenone, 2,2',4,4'-tetrahydroxybenzophenone, or 2,2'-dihydroxy-4,4'-dimethoxybenzophenone.

[11] The polymerizable composition for an optical material according to any one of [1] to [10], wherein the radical polymerization initiator (B) is at least one kind selected from the group consisting of a peroxyketal-based polymerization initiator represented by General Formula (b1) having a 10-hour half-life temperature of 80° C. or higher, a peroxymonocarbonate-based polymerization initiator represented by General Formula (b2) having a 10-hour half-life temperature of 80° C. or higher, and a peroxyester-based polymerization initiator represented by General Formula (b3) having a 10-hour half-life temperature of 65° C. or higher,

wherein in General Formula (b1), $R_3$ is a tertiary alkyl group, $R_1$ and $R_2$ are each independently an alkyl group selected from methyl, ethyl, propyl, and butyl, and the alkyl group may have an alkyl ester group at a terminal of a chain, or $R_1$ and $R_2$ may form a cycloalkylene group together with carbon atoms bonded thereto, and the cycloalkylene group may have 1 to 3 alkyl substituents,

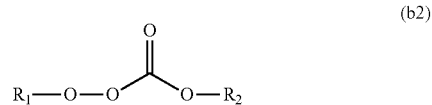

wherein in General Formula (b2), $R_1$ is a tertiary alkyl group having 3 to 6 carbon atoms, and $R_2$ is a linear or branched alkyl group having 3 to 8 carbon atoms, and

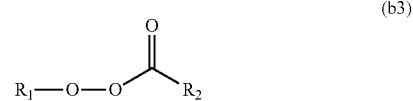

wherein in General Formula (b3), $R_1$ is a tertiary alkyl group having 3 to 6 carbon atoms, and $R_2$ is a linear or branched alkyl group having 3 to 9 carbon atoms or a phenyl group.

[12] The polymerizable composition for an optical material according to any one of [1] to [11], wherein $R_{26}$ of the polyether group represented by General Formula (c1a) is a hydrogen atom or a linear or branched alkyl group having 1 to 20 carbon atoms.

[13] The polymerizable composition for an optical material according to any one of [1] to [11],
wherein $R_{26}$ of the polyether group represented by General Formula (c1a) is a linear or branched alkenyl group having 2 to 20 carbon atoms or a linear or branched alkynyl group having 2 to 20 carbon atoms.

[14] A molded product obtained by curing the polymerizable composition for an optical material according to any one of [1] to [13].

[15] An optical material comprising the molded product according to [14].

[16] A plastic lens comprising the molded product according to [14].

[17] A method for manufacturing a plastic lens, comprising:
a step of preparing a polymerizable composition for an optical material by mixing
a compound (A) represented by General Formula (a) and including two or more allyloxycarbonyl groups,
at least one kind of radical polymerization initiator (B) selected from the group consisting of a peroxyketal-based radical polymerization initiator, a peroxymonocarbonate-based radical polymerization initiator, and a peroxyester-based radical polymerization initiator, and
a modifier (C) selected from a polyether modified siloxane compound represented by General Formula (c1) or a polyol compound represented by General Formula (c2), and
a step of casting and polymerizing the polymerizable composition for an optical material to form a lens base material,

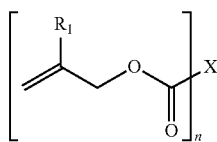

(a)

wherein in General Formula (a), n represents an integer of 2 to 6, $R_1$ represents a hydrogen atom or a methyl group, a plurality of present $R_1$'s may be the same or different, X is a divalent to hexavalent organic group a derived from a linear or branched aliphatic polyol having 3 to 12 carbon atoms which optionally have an oxygen atom, a divalent to hexavalent organic group b derived from an alicyclic polyol having 5 to 16 carbon atoms which optionally have an oxygen atom, or a divalent to hexavalent organic group c derived from an aromatic compound having 6 to 12 carbon atoms, and the organic group a or the organic group b forms an allyl carbonate group by bonding to an allyloxycarbonyl group via an oxygen atom derived from a hydroxyl group provided in these groups,

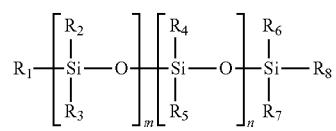

(c1)

wherein in General Formula (c1), $R_1$ to $R_8$ may be the same or different, and at least one of $R_1$ to $R_8$ represents a polyether group represented by General Formula (c1a), and other $R_1$ to $R_8$ may be the same or different and represent a linear or branched alkyl group having 1 to 20 carbon atoms, a linear or branched alkoxy group having 1 to 20 carbon atoms, a hydroxyl group, or a polysiloxy group, the plurality of present $R_2$ to $R_5$ may be the same as each other or different, m and n may be the same or different and represent an integer of 0 or more,

(c1a)

wherein in General Formula (c1a), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms, a plurality of present $R_{23}$'s may be the same or different, k represents an integer of 1 or more, and

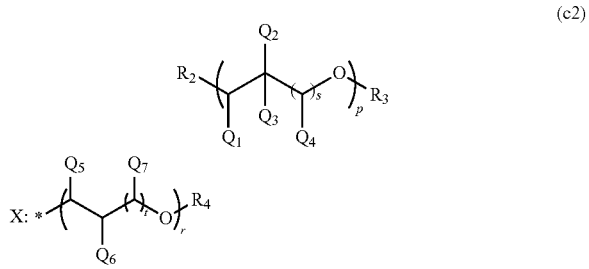

(c2)

wherein in General Formula (c2), $R_2$ represents a hydroxyl group, an —OX group, or a linear or branched alkyl group having 1 to 4 carbon atoms, $R_3$ represents a hydrogen atom, an X group, or a linear or branched alkyl group having 1 to 4 carbon atoms, $R_4$ represents a hydrogen atom or a linear or branched alkyl group having 1 to 4 carbon atoms, $Q_1$ to $Q_7$ each independently represent a hydrogen atom, a linear or branched alkyl group having 1 to 4 carbon atoms, a —CH$_2$—OX group, or an —OX group, p represents an integer of 1 to 4, s represents an integer of 0 to 4, t represents an integer of 0 to 4, and r represents an integer of 1 to 1,000, a plurality of present $Q_1$ to $Q_7$, X, s, and t may be the same or different, and * represents a bonding hand.

[18] The method for manufacturing a plastic lens according to [17],
wherein the step of preparing the polymerizable composition for an optical material is a step of preparing a polymerizable composition for an optical material by further mixing an ultraviolet absorber (D) represented by General Formula (d), and

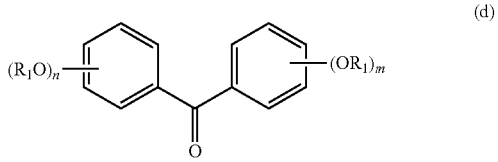

(d)

wherein in General Formula (d), $R_1$ represents a hydrogen atom or a linear or branched alkyl group having 1 to 20 carbon atoms, a plurality of present $R_1$'s may be the same or different, m represents an integer of 1 to 3, n represents an integer of 1 to 3, and the sum of m and n represents an integer of 3 to 6.

[19] The method for manufacturing a plastic lens according to [17] or [18], wherein the step of preparing the polymerizable composition for an optical material is a step of preparing a polymerizable composition for an optical material by further mixing at least one kind of dye (E) selected from an anthraquinone-based dye, a perinone-based dye, a monoazo-based dye, a diazo-based dye, and a phthalocyanine-based dye.

In the present invention, cracks during polymerization refer to a state in which, when a molded product is formed by heating and curing the polymerizable composition for an optical material in a mold, cracks are occurred in any portion of the molded product in the mold. In addition, breaking during releasing refers to a state in which breaking occurs in any portion of the molded product in a step of releasing a molded product from a mold after forming the molded product by heating and curing the polymerizable composition for an optical material in a mold.

Advantageous Effects of Invention

According to the polymerizable composition for an optical material of the present invention, it is possible to suppress the occurrence of cracks during polymerization and breaking during releasing and to provide an optical material which is transparent and excellent in appearance. Since the optical material of the present invention is transparent, excellent in appearance, and excellent in productivity, it is possible to suitably use the optical material as a plastic eyeglass lens in particular.

DESCRIPTION OF EMBODIMENTS

A description will be given of the polymerizable composition for an optical material of the present invention based on the following embodiments.

A polymerizable composition for an optical material including a compound (A) represented by General Formula (a) and including two or more allyloxycarbonyl groups, at least one kind of radical polymerization initiator (B) selected from the group consisting of a peroxyketal-based radical polymerization initiator, a peroxymonocarbonate-based radical polymerization initiator, and a peroxyester-based radical polymerization initiator; and a modifier (C) selected from a polyether modified siloxane compound represented by General Formula (c1) or a polyol compound represented by General Formula (c2).

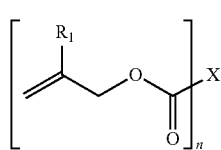

(a)

In General Formula (a), n represents an integer of 2 to 6. $R_1$ represents a hydrogen atom or a methyl group, a plurality of present $R_1$'s may be the same or different. X is a divalent to hexavalent organic group a derived from a linear or branched aliphatic polyol having 3 to 12 carbon atoms which optionally have an oxygen atom, a divalent to hexavalent organic group b derived from an alicyclic polyol having 5 to 16 carbon atoms which optionally have an oxygen atom, or a divalent to hexavalent organic group c derived from an aromatic compound having 6 to 12 carbon atoms, and the organic group a or the organic group b forms an allyl carbonate group by bonding to an allyloxycarbonyl group via an oxygen atom derived from a hydroxyl group provided in these groups.

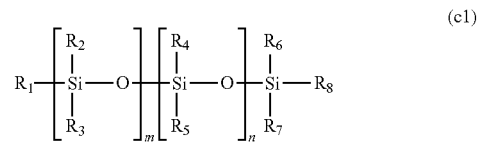

(c1)

In General Formula (c1), $R_1$ to $R_8$ may be the same or different, and at least one of $R_1$ to $R_8$ represents a polyether group represented by General Formula (c1a), and other $R_1$ to $R_8$ may be the same or different and represent a linear or branched alkyl group having 1 to 20 carbon atoms, a linear or branched alkoxy group having 1 to 20 carbon atoms, a hydroxyl group, or a polysiloxy group. The plurality of present $R_2$ to $R_5$ may be the same as each other or different. m and n may be the same or different and represent an integer of 0 or more.

(c1a)

In General Formula (c1a), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms. A plurality of present $R_{25}$'s may be the same or different. k represents an integer of 1 or more.

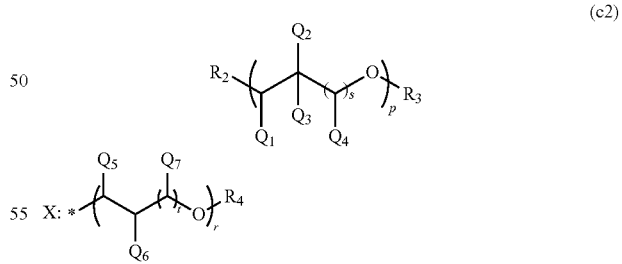

(c2)

In General Formula (c2), $R_2$ represents a hydroxyl group, an —OX group, or a linear or branched alkyl group having 1 to 4 carbon atoms. $R_3$ represents a hydrogen atom, an X group, or a linear or branched alkyl group having 1 to 4 carbon atoms. $R_4$ represents a hydrogen atom or a linear or branched alkyl group having 1 to 4 carbon atoms. $Q_1$ to $Q_7$ each independently represent a hydrogen atom, a linear or branched alkyl group having 1 to 4 carbon atoms, a —CH$_2$—OX group, or an —OX group. p represents an integer of 1 to 4, s represents an integer of 0 to 4, t represents an integer of 0 to 4, and r represents an integer of 1 to 1,000.

A plurality of present $Q_1$ to $Q_7$, X, s, and t may be the same or different. * represents a bonding hand.

Using a combination of component (A) to component (C) in the polymerizable composition for an optical material of the present embodiment makes it possible to further suppress the occurrence of cracks during polymerization and breaking during releasing while maintaining a good color and transparency, and productivity is excellent.

A description will be given of each component.

[Compound (A) Including Two or More Allyloxycarbonyl Groups]

It is possible to represent the compound (A) including two or more allyloxycarbonyl groups in the present embodiment by General Formula (a).

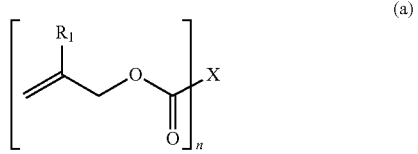

(a)

In General Formula (a), n represents an integer of 2 to 6. $R_1$ represents a hydrogen atom or a methyl group, and a plurality of present $R_1$'s may be the same or different.

X is a divalent to hexavalent organic group a derived from a linear or branched aliphatic polyol a1 having 3 to 12 carbon atoms which optionally have an oxygen atom, a divalent to hexavalent organic group b derived from an alicyclic polyol b1 having 5 to 16 carbon atoms which optionally have an oxygen atom, or a divalent to hexavalent organic group c derived from an aromatic compound c1 having 6 to 12 carbon atoms, and the organic group a or the organic group b forms an allyl carbonate group by bonding to an allyloxycarbonyl group via an oxygen atom derived from a hydroxyl group provided in these groups.

Normally, it is possible for these polyols to include 2 to 6 hydroxyl groups in the molecule, and it is preferable for these polyols to include 2 to 4 hydroxyl groups in the molecule.

Examples of the aliphatic polyol a1 include diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, glycerol, trimethylolpropane, tris(hydroxyethyl)isocyanurate, pentaerythritol, dipentaerythritol, and the like.

Examples of the alicyclic polyol b1 include 1,4-dimethylolcyclohexane, 4,8-bis(hydroxymethyl)-[5.2.1.0$^{2,6}$] tricyclodecane, and the like.

Examples of the aromatic compound c1 include benzene, toluene, xylene, naphthalene, and the like.

Specific examples of the compound (A) including two or more allyloxycarbonyl groups include an allyl carbonate polymerizable compound (A1), an allyl ester polymerizable compound (A2), and a polymerizable compound (A3) which includes at least one of an allyl carbonate group and an allyl ester group.

It is possible for the compound (A) including two or more allyloxycarbonyl groups to include an oligomer thereof. A compound including two or more allyloxycarbonyl groups is a liquid product at room temperature, the viscosity measured at 25° C. is 10 to 1000 cSt, and it is possible to change the oligomer content in a wide range, for example, 0 to approximately 80% by weight.

(Allyl Carbonate Polymerizable Compound (A1))

It is possible for the allyl carbonate polymerizable compound (A1) to be represented by General Formula (a1) and it is possible to include an oligomer thereof. The oligomer is a poly(allyl carbonate) in which two or more molecules of a polyol are linked via a carbonate group produced by transesterification reaction of allyl carbonate produced in a production step and a polyol.

The allyl carbonate polymerizable compound is a poly (allyl carbonate) compound of a linear or branched aliphatic polyol having 3 to 12 carbon atoms. A poly(allyl carbonate) compound of an alicyclic polyol having 5 to 16 carbon atoms in the molecule is also suitable for this purpose. These polyols usually have 2 to 6 hydroxyl groups in the molecule and it is possible for these polyols to have 2 to 4 hydroxyl groups in the molecule, which is preferable. It is also possible to use a mixed poly(allyl carbonate) compound, that is, a compound which is derived from at least two kinds of polyols and which can be obtained by mechanical mixing of the respective polyol poly(allyl carbonate) compounds, or a compound obtained directly by a chemical reaction starting from a mixture of polyols and diallyl carbonate.

Finally, it is possible for all these poly(allyl carbonate) compounds to be in the form of monomers or mixtures of monomers and oligomers. Generally, the allyl carbonate polymerizable compound is a liquid product at room temperature, the viscosity measured at 25° C. is 10 to 1000 cSt, and it is possible to change the oligomer content in a wide range, for example, 0 to approximately 80% by weight.

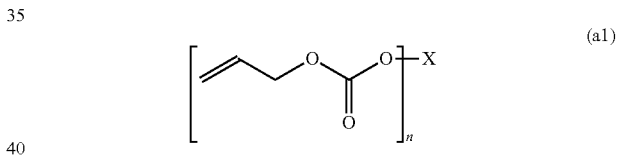

(a1)

In General Formula (a1), X represents a divalent to hexavalent group derived from a linear or branched aliphatic polyol having 3 to 12 carbon atoms or a divalent to hexavalent group derived from an alicyclic polyol having 5 to 16 carbon atoms, and n represents an integer of 2 to 6.

Specific examples of the polyols forming X in General Formula (a1) include diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, 4,8-bis(hydroxymethyl)-[5.2.1.0$^{2,6}$] tricyclodecane, glycerol, trimethylolpropane, tris(hydroxyethyl)isocyanurate, pentaerythritol, diglycerol, ditrimethylolpropane, dipentaerythritol, and the like.

Accordingly, examples of the allyl carbonate compounds include at least one kind selected from bis(allyl carbonate) compounds of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1, 5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$] tricyclodecane; tris(allyl carbonate) compounds of at least one kind of triol selected from glycerol, trimethylolpropane, and tris(hydroxyethyl)isocyanurate; tetra(allyl carbonate) compounds of at least one kind of tetraol selected from pentaerythritol, diglycerol, and ditrimethylol propane; dipentaerythritol hexa(allyl carbonate) compounds; and a mixed poly(allyl carbonate) compound of at least two kinds of compounds selected from the diols, the triols, the tetraols, and the dipentaerythritol.

The "bis(allyl carbonate) of a mixture of at least two kinds of diols" is, for example, obtained as a mixture of the following monomer components and oligomer components in a case where the diols are diethylene glycol and neopentyl glycol.

Monomer Components
(1) Diethylene glycol bis(allyl carbonate)
(2) Neopentyl glycol bis(allyl carbonate)
Oligomer Components
(3) Oligomer including only hydrocarbons (and ethers) derived from diethylene glycol (a compound having a structure in which two hydroxyl groups of a compound in which diethylene glycol is linearly oligomerized via a carbonate bond are replaced with allyl carbonate groups)
(4) Oligomer including only hydrocarbons derived from neopentyl glycol (a compound having a structure in which two hydroxyl groups of a compound in which neopentyl glycol is linearly oligomerized via a carbonate bond are replaced with allyl carbonate groups)
(5) Complex oligomer including both hydrocarbons (and ethers) derived from diethylene glycol and a hydrocarbon derived from neopentyl glycol in the same molecule (a compound having a structure in which two hydroxyl groups of a compound in which diethylene glycol and neopentyl glycol are linearly oligomerized in an arbitrary sequence in the same molecule via a carbonate bond are replaced with allyl carbonate groups)

The following are preferable examples of the allyl carbonate polymerizable compound (A1) suitable for the purposes of the present invention and at least one type selected therefrom is to be included.

(i) Mixture with Diethylene Glycol Bis(Allyl Carbonate) and Oligomers Thereof

It is possible to define diethylene glycol bis(allyl carbonate) by Formula (I).

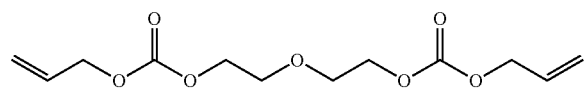

(I)

In addition, it is possible to define an oligomer of diethylene glycol bis(allyl carbonate) by Formula (II).

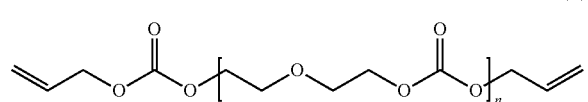

(II)

In Formula (II), n is 2 to 10.

It is possible to produce compound (I) by reacting diethylene glycol bis(chloroformate) with allyl alcohol as described in, for example, "Encyclopedia of Chemical Technology", Kirk-Othmer, Third Edition, Volume 2, pages 111-112. It is possible to easily produce mixtures of diethylene glycol-bis(allyl carbonate) (Formula (I)) and an oligomer (Formula (II)) thereof by transesterification between diallyl carbonate and diethylene glycol in the presence of a basic catalyst, for example, as described in European Patent No. 35,304. These mixtures usually include up to approximately 80% by weight of oligomers.

(ii) Mixture of Bis(Allyl Carbonate) Compound of a Mixture of Diethylene Glycol and Neopentyl Glycol, and Oligomers Thereof This bis(allyl carbonate) compound is the same as the diethylene glycol bis(allyl carbonate) compound of (i) above except that diethylene glycol is replaced with a mixture of diethylene glycol and neopentyl glycol.

(iii) Mixture of Poly(Allyl Carbonate) Compound of a Mixture of Diethylene Glycol and Tris(Hydroxyethyl) Isocyanurate with Oligomers Thereof It is possible to obtain the poly(allyl carbonate) compound by ester replacement of a diallyl carbonate of a mixture of diethylene glycol and tris(hydroxyethyl) isocyanurate, for example, as described in U.S. Pat. No. 4,812,545.

(iv) Mixture of Poly(Allyl Carbonate) Compound of a Mixture of Diethylene Glycol and Trimethylolpropane with Oligomers Thereof This poly(allyl carbonate) compound is the same as the poly(allyl carbonate) compound of point (iii) above, except that tris(hydroxyethyl) isocyanurate is replaced with trimethylol propane.

(v) Mixture of Poly(Allyl Carbonate) Compound of a Mixture of Diethylene Glycol and Pentaerythritol with Oligomers Thereof This poly(allyl carbonate) compound is the same as the poly(allyl carbonate) compound of point (iii) above, except that tris(hydroxyethyl) isocyanurate is replaced with pentaerythritol.

(vi) Mixture of Poly(Allyl Carbonate) Compound of a Mixture of Diethylene Glycol, Neopentyl Glycol, and Pentaerythritol with Oligomers Thereof This poly(allyl carbonate) compound is the same as the poly(allyl carbonate) compound of point (v) above, except that diethylene glycol is replaced with two kinds of diols of diethylene glycol and neopentyl glycol.

(vii) Poly(Allyl Carbonate) Mixture Including a Mixture of Poly(Allyl Carbonate) Compound of a Mixture of Diethylene Glycol, Neopentyl Glycol, and Pentaerythritol with Oligomers Thereof and a Mixture of Diethylene Glycol Bis(Allyl Carbonate) Compound with Oligomers Thereof (Allyl Ester Polymerizable Compound (A2), Polymerizable Compound (A3))

Examples of the allyl ester polymerizable compound (A2) include diallyl phthalate represented by General Formula (a2-1) and oligomers thereof, and allyl ester compounds represented by General Formula (a2-2) and oligomers thereof obtained by transesterification reaction of a mixture of diallyl phthalate and a polyol. Examples of the polymerizable compound (A3) include a polymerizable compound represented by General Formula (a3) including at least one of an allyl ester group and an allyl carbonate group and oligomers thereof.

The polymerizable compound represented by General Formula (a3) includes a mixture of an allyl ester compound, an allyl carbonate compound, and compounds having an allyl ester group and an allyl carbonate group, obtained by transesterification reaction of a mixture of dialkyl phthalate, allyl alcohol, diallyl carbonate, and a polyol.

In the present embodiment, the compounds of general Formulas (a2-1), (a2-2) and (a3) include regioisomers.

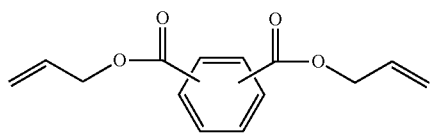

(a2-1)

The diallyl phthalate represented by General Formula (a2-1) is at least one kind selected from diallyl isophthalate, diallyl terephthalate, and diallyl orthophthalate.

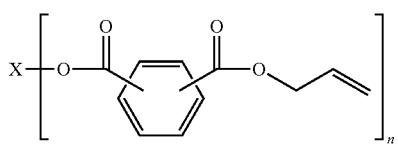

(a2-2)

In General Formula (a2-2), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, and n represents an integer of 2 to 6.

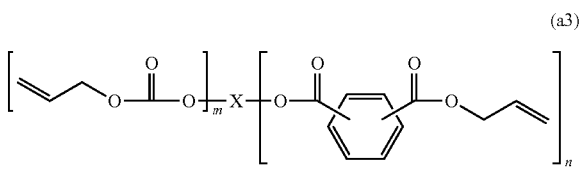

(a3)

In General Formula (a3), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, m and n represent integers of 0 to 6, and the sum of m and n represents an integer of 2 to 6.

Specific examples of the diallyl phthalate to be used are diallyl isophthalate, diallyl terephthalate, and diallyl orthophthalate, the dialkyl phthalate is a phthalic acid diester having an alkyl group having 1 to 3 carbon atoms, and specific examples thereof include dimethyl isophthalate, dimethyl terephthalate, dimethyl orthophthalate, diethyl isophthalate, diethyl terephthalate, diethyl orthophthalate, dipropyl isophthalate, dipropyl terephthalate, and dipropyl orthophthalate.

Specific examples of the polyol (aliphatic diol, aliphatic polyol) forming X in General Formula (a2-2) and General Formula (a3) include diols of ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane; triols of glycerol and trimethylolpropane; and polyols of tris(hydroxyethyl) isocyanurate, pentaerythritol, diglycerol, ditrimethylol propane, and dipentaerythritol.

It is possible for the compounds of Formula (a2-2) and Formula (a3) to include oligomers thereof. The oligomer in Formula (a2-2) is produced by transesterification reaction of an allyl ester compound produced in a production step and a polyol. The oligomer in Formula (a3) is produced by transesterification reaction of the allyl ester compound or the allyl carbonate compound produced in the production step and the polyol.

Accordingly, the allyl ester polymerizable compound (A2) or the polymerizable compound (A3) includes at least one kind selected from, for example, a diallyl phthalate compound selected from diallyl isophthalate, diallyl terephthalate, and diallyl orthophthalate; diallyl ester compounds and oligomers thereof obtained by transesterification reaction between the diallyl phthalate compound and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and the like; a polyallyl ester compound and an oligomer thereof obtained by transesterification reaction between the diallyl phthalate compound and a mixture of at least one kind of polyol selected from triols of glycerol and trimethylolpropane, tris(hydroxyethyl) isocyanurate, pentaerythritol, diglycerol, ditrimethylol propane, dipentaerythritol, and the like; and an allyl ester compound, an allyl carbonate compound, a compound having an allyl carbonate group and an allyl ester group, and oligomers thereof, obtained by transesterification reaction of a mixture of at least one kind of dialkyl phthalate having 1 to 3 carbon atoms selected from dimethyl isophthalate, dimethyl terephthalate, dimethyl orthophthalate, diethyl isophthalate, diethyl terephthalate, diethyl orthophthalate, dipropyl isophthalate, dipropyl terephthalate, and dipropyl orthophthalate, an allyl alcohol, diallyl carbonate, and the diol or polyol described above.

More specifically, the allyl ester polymerizable compound (A2) or the polymerizable compound (A3) preferably includes at least one kind selected from (i) a mixture of diallyl terephthalate and a diethylene glycol bis(allyl carbonate) compound at 30% by weight with respect to the diallyl terephthalate and an oligomer thereof, (ii) an allyl ester compound obtained by transesterification reaction of a mixture of diallyl terephthalate and propylene glycol, (iii) a mixture of the allyl ester compound of (ii) and a diethylene glycol bis(allyl carbonate) compound at 20% by weight with respect to the allyl ester compound and an oligomer thereof, (iv) a mixture of an allyl ester compound, an allyl carbonate compound, and a compound having an allyl ester group and an allyl carbonate group, obtained by transesterification reaction of a mixture of dimethyl terephthalate, allyl alcohol, diallyl carbonate, and diethylene glycol, and (v) a mixture of the mixture obtained in (iv) and a diethylene glycol bis(allyl carbonate) compound at 10% by weight with respect to the mixture and an oligomer thereof.

The following are preferable examples of the allyl ester polymerizable compound (A2) or the polymerizable compound (A3) suitable for the purposes of the present invention. (i) a mixture of an allyl ester compound, an allyl carbonate compound, and a compound having an allyl ester group and an allyl carbonate group, obtained by transesterification reaction of a mixture of dimethyl terephthalate, allyl alcohol, diallyl carbonate, and diethylene glycol.

It is possible for the allyl ester polymerizable compound (A2) or the polymerizable compound (A3) described above to be defined by the Formulas (III) to (V), the diallyl terephthalate of Formula (III) is the main component thereof, and each includes an oligomer obtained by transesterification reaction with a polyol.

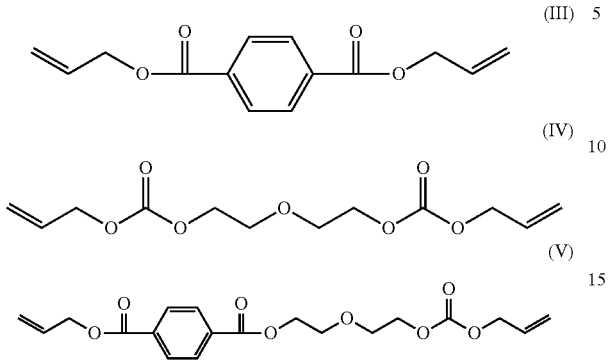

In the present embodiment, from the viewpoint of the effect of the present invention, it is possible to set the compound (A) including two or more allyloxycarbonyl groups as a mixture of the allyl ester polymerizable compound (A2) and/or the polymerizable compound (A3) and oligomers thereof with the allyl carbonate polymerizable compound (A1) and an oligomer thereof.

[Radical Polymerization Initiator (B)]

The radical polymerization initiator (B) in the present embodiment is at least one type of radical polymerization initiator selected from the group consisting of a peroxyketal-based radical polymerization initiator, a peroxymonocarbonate-based radical polymerization initiator, and a peroxyester-based radical polymerization initiator.

More specifically, as the radical polymerization initiator (B) of the present embodiment, a peroxyketal-based radical polymerization initiator (a) having a 10-hour half-life temperature of 80° C. or higher represented by General Formula (b1), and/or a peroxymonocarbonate-based radical polymerization initiator (b) having a 10-hour half-life temperature of 80° C. or higher represented by General Formula (b2), and/or a peroxyester-based radical polymerization initiator (c) having a 10-hour half-life temperature of 65° C. or higher represented by General Formula (b3) is used.

In General Formula (b1), $R_3$ is a tertiary alkyl group, $R_1$ and $R_2$ are each independently an alkyl group selected from methyl, ethyl, propyl, and butyl, the alkyl group being able to have a functional group such as an alkyl ester group at the end of chain for example, or $R_1$ and $R_2$ may be bonded with each other and be able to form a cycloalkylene group together with a carbon atom to which $R_1$ and $R_2$ are bonded, and the cycloalkylene group may have 1 to 3 alkyl substituents.

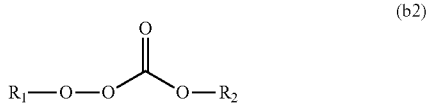

In General Formula (b2), $R_1$ is a tertiary alkyl group having 3 to 6 carbon atoms, and $R_2$ is a linear or branched alkyl group having 3 to 8 carbon atoms.

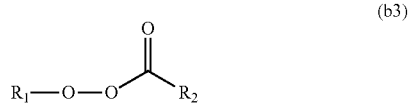

In General Formula (b3), $R_1$ is a tertiary alkyl group having 3 to 6 carbon atoms, and $R_2$ is a linear or branched alkyl group or phenyl group having 3 to 9 carbon atoms.

Examples of the peroxyketal-based radical polymerization initiator (a) {the content of the brackets indicates the 10-hour half-life temperature} include 1,1-bis(t-butylperoxy)-3,3,5-trimethylcyclohexane (83° C.), 1,1-bis(t-hexylperoxy)-3,3,5-trimethylcyclohexane (90° C.), 2,2-bis(t-butylperoxy)butane (107° C.), n-butyl-4,4-bis(t-butylperoxy)valerate (109° C.), ethyl 3,3-bis(t-butylperoxy) valerate (114° C.), 1,1-bis(t-butylperoxy)cyclohexane (91° C.), 1,1-bis(t-butylperoxy)-2-methylcyclohexane (83° C.), 1,1-bis(t-amylperoxy)cyclohexane (93° C.), 1,1-bis(t-hexylperoxy)cyclohexane (87° C.), 1,1-bis(t-hexylperoxy)-3,3,5-trimethylcyclohexane (87° C.), and 2,2-bis[4,4-(di-t-butylperoxy)cyclohexyl] propane (95° C.).

Examples of the peroxymonocarbonate-based radical polymerization initiator (b) {the content of the brackets indicates the 10-hour half-life temperature} include OO-(t-butyl)-O-isopropyl monoperoxycarbonate (99° C.), OO-(t-amyl)-O-isopropyl monoperoxycarbonate (96° C.), OO-(t-butyl)-O-(2-ethylhexyl)monoperoxycarbonate (99° C.), and OO-(t-amyl)-O-(2-ethylhexyl)monoperoxycarbonate (99° C.).

Examples of the peroxyester-based radical polymerization initiator (c) {the content of the brackets indicates the 10-hour half-life temperature} include t-butylperoxy-2-ethylhexanoate (72° C.), t-butylperoxyisobutyrate (82° C.), t-butylperoxy-3,3,5-trimethylhexanoate (97° C.), t-butylperoxyacetate (102° C.), t-butylperoxyisononanoate (102° C.), t-butylperoxybenzoate (104° C.), t-amylperoxy-2-ethylhexanoate (75° C.), t-amylperoxynormaloctoate (96° C.), t-amylperoxyacetate (100° C.), t-amylperoxyisononate (96° C.), t-amylperoxybenzoate (100° C.), t-hexylperoxy-2-ethylhexanoate (70° C.), t-hexylperoxybenzoate (99° C.), and 1,1,3,3-tetramethylbutylperoxy-2-ethylhexanoate (65° C.).

The diisopropyl peroxydicarbonate (IPP) catalyst has excellent catalytic action and is excellent in formability but has problems in terms of handling and storage stability. On the other hand, the radical polymerization initiators described above are superior in terms of handling and storage stability as compared with the IPP catalyst, but have poor catalytic action. In the present embodiment, by using component (A) and component (C) in combination, the formability is excellent even in a case where these radical polymerization initiators are used and it is possible to suppress the occurrence of cracks during polymerization and breaking during releasing.

In the present embodiment, as the radical polymerization initiator (B), it is preferable to use the peroxyketal-based radical polymerization initiator of (a) or the peroxymonocarbonate-based radical polymerization initiator of (b), specifically, it is preferable to use OO-(t-butyl)-O-(2-ethylhexyl)monoperoxycarbonate, OO-(t-amyl)-O-(2-ethylhexyl)monoperoxycarbonate, 1,1-bis(t-butylperoxy) cyclohexane, 1,1-bis(t-amylperoxy)cyclohexane, 1,1-bis(t- hexylperoxy)cyclohexane, 1,1-bis(t-hexylperoxy)-3,3,5-trimethylcyclohexane, and the like.

In the present embodiment, the usage amount of the radical polymerization initiator (B) varies depending on the polymerization conditions, the type of the initiator, the purity of the initiator, the diluent to be used, and the composition of the compound (A) and it is not possible to put limits thereon as a rule; however, the usage amount is 0.3 to 5.0 parts by weight with respect to 100 parts by weight of the compound (A) including an allyloxycarbonyl group, and preferably 0.5 to 3.0 parts by weight, and it is also possible to use a combination of two types or more of radical polymerization initiators.

In addition, when polymerizing the polymerizable composition for an optical material of the present embodiment, among the polymerization conditions, the temperature, in particular, affects the properties of the cured product to be obtained. This temperature condition is influenced by the type and amount of the radical polymerization initiator (B) and the type of the monomer and it is not possible to put limits thereon as a rule, but, in general, it is preferable if the polymerization is started at a comparatively low temperature, the temperature is slowly raised, and curing is carried out at a high temperature when finishing polymerization. Since the polymerization time also varies depending on various factors in the same manner as the temperature, it is preferable to determine the optimum time according to these conditions beforehand, but, in general, the conditions are selected such that the polymerization is completed in 12 to 24 hours. In addition, the polymerizable composition for an optical material of the present embodiment does not require strict control at 35° C. or lower, curing is possible even with a pattern starting at 60° C. or higher, molding is easy, and the yield is high.

[Modifier (C)]

In the present embodiment, it is possible to select the modifier (C) from the polyether-modified siloxane compound (C1) represented by General Formula (c1) or the polyol compound (C2) represented by General Formula (c2).

(Polyether Modified Siloxane Compound (C1))

As the polyether-modified siloxane compound (C1) in the present embodiment, it is possible to use a compound represented by General Formula (c1).

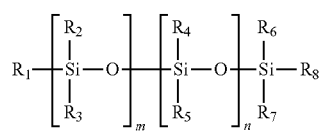

(c1)

$R_1$ to $R_8$ may be the same or different and at least one of $R_1$ to $R_8$ represents a polyether group represented by General Formula (c1a), the other $R_1$ to $R_8$ may be the same or different and represent a linear or branched alkyl group having 1 to 20 carbon atoms, a linear or branched alkoxy group having 1 to 20 carbon atoms, a hydroxyl group, or a polysiloxy group. The plurality of present $R_2$ to $R_5$ may be the same as each other or different. m and n, which may be the same or different, represent an integer of 0 or more, preferably an integer of 1 to 20, and more preferably an integer of 1 to 10.

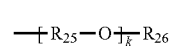

(c1a)

In General Formula (c1a), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms. A plurality of present $R_{25}$'s may be the same or different. k represents an integer of 1 or more.

Here, it is possible to appropriately select k indicating the polymerization number of the polyether moiety from an integer of 1 or more, preferably an integer of 1 to 20, and more preferably an integer of 1 to 10.

In addition, in one embodiment, from the viewpoint of suppressing the occurrence of cracks during polymerization and breaking during releasing, k preferably represents an integer of 1 to 1000, more preferably an integer of 40 to 600, and even more preferably an integer of 55 to 550.

In addition, in one embodiment, $R_{26}$ of the polyether group represented by General Formula (c1a) is preferably a hydrogen atom or a linear or branched alkyl group having 1 to 20 carbon atoms.

In addition, in one embodiment, $R_{26}$ of the polyether group represented by General Formula (c1a) is a linear or branched alkenyl group having 2 to 20 carbon atoms or a linear or branched alkynyl group having 2 to 20 carbon atoms.

In addition, in one embodiment, from the viewpoint of suppressing the occurrence of cracks during polymerization and breaking during releasing, $R_{26}$ of the polyether group represented by General Formula (c1a) is preferably a hydrogen atom or a linear or branched alkenyl group having 2 to 20 carbon atoms, and more preferably a hydrogen atom or a linear or branched alkenyl group having 2 to 8 carbon atoms.

Specific examples of each substituent in General Formula (c1) described above include the examples shown below.

Examples of the linear or branched alkylene group having 1 to 20 carbon atoms include a methylene group, an ethylene group, an n-propylene group, an isopropylene group, an n-butylene group, an isobutylene group, a t-butylene group, an n-pentylene group, an isopentylene group, an t-pentylene group, an n-hexylene group, an n-heptylene group, an isoheptylene group, an n-octylene group, an isooctylene group, an n-nonylene group, an isononylene group, an n-decylene group, an isodecylene group, an n-undecylene group, an isoundecylene group, an n-dodecylene group, an isododecylene group, a cyclopentylene group, a cyclohexylene group, a cycloheptylene group, a cyclooctylene group, a cyclononylene group, a methylcyclopentylene group, a methylcyclohexylene group, and the like.

A linear or branched alkylene group having 1 to 8 carbon atoms is preferable.

Examples of the linear or branched alkyl group having 1 to 20 carbon atoms include a methyl group, an ethyl group, an n-propyl group, an isopropyl group, an n-butyl group, an isobutyl group, a t-butyl group, an n-pentyl group, an isopentyl group, a t-pentyl group, an n-hexyl group, an n-heptyl group, an isoheptyl group, an n-octyl group, an isooctyl group, an n-nonyl group, an isononyl group, an n-decyl group, an isodecyl group, an n-undecyl group, an isoundecyl group, an n-dodecyl group, an isododecyl group, a cyclopentyl group, a cyclohexyl group, a cycloheptyl group, a cyclooctyl group, a cyclononyl group, a methylcyclopentyl group, a methyl cyclohexyl group, and the like.

A linear or branched alkyl group having 1 to 8 carbon atoms is preferable.

Examples of the linear or branched alkoxy group having 1 to 20 carbon atoms include a methoxy group, an ethoxy group, an n-propyloxy group, an isopropyloxy group, an n-butyloxy group, an isobutyloxy group, a t-butyloxy group, an n-pentyloxy group, an isopentyloxy group, a t-pentyloxy group, an n-hexyloxy group, an n-heptyloxy group, an isoheptyloxy group, an n-octyloxy group, an isooctyloxy group, an n-nonyloxy group, an isononyloxy group, an n-decyloxy group, an isodecyloxy group, an n-undecyloxy group, an isoundecyloxy group, an n-dodecyloxy group, an isododecyloxy group, a cyclopentyloxy group, a cyclohexyloxy group, a cycloheptyloxy group, a cyclooctyloxy group, a cyclononyloxy group, a methylcyclopentyloxy group, a methylcyclohexyl group, and the like.

A linear or branched alkoxy group having 1 to 8 carbon atoms is preferable.

Examples of the linear or branched alkenyl group having 2 to 20 carbon atoms include a vinyl group, a 1-propenyl group, a 2-propenyl group, a 1-butenyl group, a 2-butenyl group, a 3-butenyl group, a 1-pentenyl group, a 2-pentenyl group, a 3-pentenyl group, a 4-pentenyl group, a 1-hexenyl group, a 2-hexenyl group, a 3-hexenyl group, a 4-hexenyl group, a 5-hexenyl group, a 6-heptenyl group, a 7-octenyl group, an 8-nonenyl group, a 9-decenyl group, a 2-methyl-1-propenyl group, a 2-methyl-2-propenyl group, a 3-methyl-3-butenyl group, a 4-methyl-4-pentenyl group, a 2-cyclohexyl-2-propenyl group, and the like.

A linear or branched alkenyl group having 2 to 8 carbon atoms is preferable.

Examples of the linear or branched alkynyl group having 2 to 20 carbon atoms include an ethynyl group, a 1-propynyl group, a 2-propynyl group, a 1-butynyl group, a 2-butynyl group, a 3-butynyl group, a 2-methyl-2-propynyl group, a 3-methyl-1-butynyl group, a 4-pentynyl group, a 5-hexynyl group, a 6-heptynyl group, a 7-octynyl group, an 8-nonynyl group, a 9-decynyl group, and the like.

A linear or branched alkynyl group having 2 to 8 carbon atoms is preferable.

Examples of the compound represented by General Formula (c1) include Polyflow KL-100, Polyflow KL-600, and Granol 410 (trade names, produced by Kyoeisha Chemical Co., Ltd.); BYK-302, BYK-307, BYK-322, BYK-323, BYK-331, BYK-333, BYK-347, BYK-348, and BYK-349 (trade names, produced by BYK-Chemie); KF-351, KF-352, KF-353, KF-354L, KF-355, KF-355A, KF-615A, and KF-618 (trade names, produced by Shin-Etsu Chemical Co., Ltd.); SH3746, SH3771, SH8400, and SF8410 (trade names, produced by Dow Corning Toray Co., Ltd.); TSF 4440, TSF 4445, TSF 4446, and TSF 4452 (trade names, produced by Toshiba Silicone Co., Ltd.); and the like, but without being limited to the exemplified compounds. These may be used singly or as a mixture of two or more.

Particularly preferable examples are Polyflow KL-100 and Polyflow KL-600 (trade names, produced by Kyoeisha Chemical Co., Ltd.).

In addition, from the viewpoint of suppressing the occurrence of cracks during polymerization and breaking during releasing, the compound represented by General Formula (c1) is preferably one type or more selected from Polyflow KL-100 and Polyflow KL-600 (trade names, produced by Kyoeisha Chemical Co., Ltd.), and more preferably Polyflow KL-100.

In addition, from the viewpoint of suppressing the occurrence of cracks during polymerization and breaking during releasing, the polyether-modified siloxane compound (E) preferably includes at least one type selected from a group consisting of a compound represented by General Formula (c1) in which $R_{26}$ of the polyether group represented by General Formula (c1a) is a hydrogen atom, and a compound represented by General Formula (c1) in which $R_{26}$ of the polyether group represented by General Formula (c1a) is a linear or branched alkenyl group having 2 to 20 carbon atoms; more preferably includes at least one type selected from a group consisting of a compound represented by General Formula (c1) in which $R_{26}$ of the polyether group represented by General Formula (c1a) is a hydrogen atom, and a compound represented by General Formula (c1) in which $R_{26}$ of the polyether group represented by General Formula (c1a) is a linear or branched alkenyl group having 2 to 8 carbon atoms; even more preferably includes at least one type selected from a group consisting of a compound represented by General Formula (c1) in which $R_{26}$ of the polyether group represented by General Formula (c1a) is a hydrogen atom, and a compound represented by General Formula (c1) in which $R_{26}$ of the polyether group represented by General Formula (c1a) is a linear or branched alkenyl group having 2 to 8 carbon atoms; and yet more preferably a compound represented by General Formula (c1-1) and a compound represented by General Formula (c1-2).

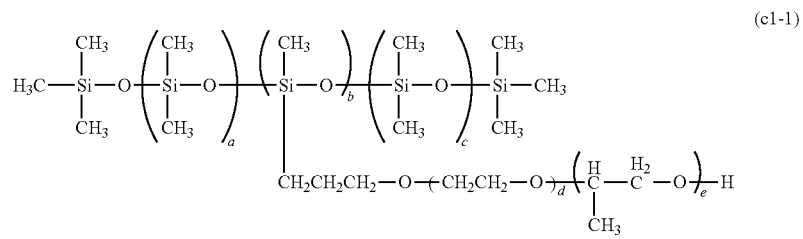

(c1-1)

From the viewpoint of suppressing the occurrence of cracks during polymerization and breaking during releasing, a+c in General Formula (c1-1) is preferably 1 to 100, and more preferably 5 to 50.

From the same viewpoint, b in General Formula (c1-1) is preferably 1 to 100, and more preferably 5 to 50.

From the same viewpoint, d in General Formula (c1-1) is preferably 10 to 1,000, and more preferably 50 to 500.

From the same viewpoint, e in General Formula (c1-1) is preferably 1 to 100, and more preferably 5 to 50.

In addition, from the same viewpoint, the molecular weight of the compound represented by General Formula (c1-1) is preferably 100 to 10000, and more preferably 1000 to 5000.

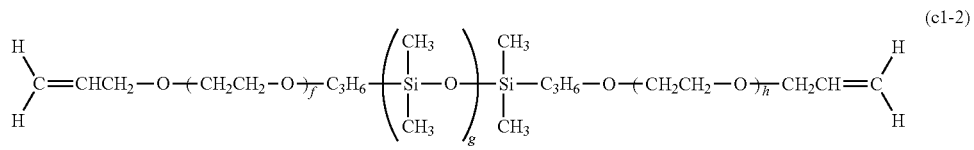

(c1-2)

From the viewpoint of suppressing the occurrence of cracks during polymerization and breaking during releasing, f+h in General Formula (c1-2) is preferably 1 to 100, and more preferably 1 to 20.

From the same viewpoint, g in General Formula (c1-2) is preferably 1 to 100, and more preferably 1 to 10.

In addition, from the same viewpoint, the molecular weight of the compound represented by General Formula (c1-2) is preferably 100 to 10,000, and more preferably 500 to 5,000.

In addition, from the viewpoint of suppressing the occurrence of cracks during polymerization and breaking during releasing, regarding the mass ratio of the compound represented by General Formula (c1-1) and the compound represented by General Formula (c1-2) in the polyether-modified compound when the polyether-modified compound includes the compound represented by General Formula (c1-1) and the compound represented by General Formula (c1-2), the mass ratio of the compound represented by General Formula (c1-1) with respect to the total mass of the compound represented by General Formula (c1-1) and the compound represented by General Formula (c1-2) is preferably 50% to 90%, and more preferably 60% to 80%.

In the present embodiment, it is possible for the usage amount of the polyether-modified siloxane compound to be 0.001 to 2 parts by mass with respect to 100 parts by mass of the compound (A), and preferably 0.01 to 1 part by mass.

(Polyol Compound (C2))

As the polyol compound (C2) in the present embodiment, it is possible to use a compound represented by General Formula (c2).

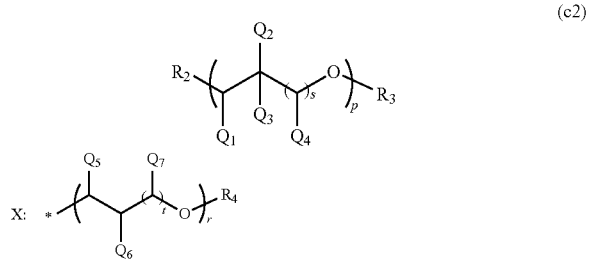

(c2)

In General Formula (c2), $R_2$ represents a hydroxyl group, an —OX group, or a linear or branched alkyl group having 1 to 4 carbon atoms. $R_3$ represents a hydrogen atom, an X group, or a linear or branched alkyl group having 1 to 4 carbon atoms. $R_4$ represents a hydrogen atom or a linear or branched alkyl group having 1 to 4 carbon atoms. $Q_1$ to $Q_7$ each independently represent a hydrogen atom, a linear or branched alkyl group having 1 to 4 carbon atoms, a —$CH_2$—OX group, or an —OX group. p represents an integer of 1 to 4, s represents an integer of 0 to 4, t represents an integer of 0 to 4, and r represents an integer of 1 to 1,000. A plurality of present $Q_1$ to $Q_7$, X, s, and t may be the same or different. * represents a bonding hand.

As the compound represented by General Formula (c2), it is possible to use compounds having a number average molecular weight of 150 or more, and preferably 200 or more.

Examples of the polyol compound (C) represented by General Formula (c2) include compounds represented by General Formulas (c2-1) to (c2-8).

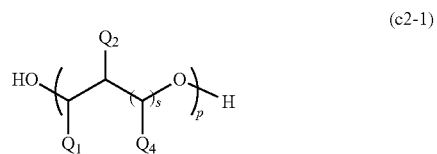

(c2-1)

In General Formula (c2-1), $Q_1$, $Q_2$, $Q_4$, s, and p have the same meanings as in General Formula (c2). A plurality of present $Q_1$, $Q_2$, $Q_4$, and s may be the same or different.

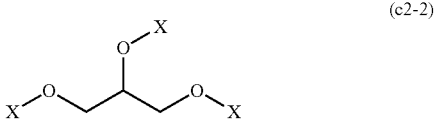

(c2-2)

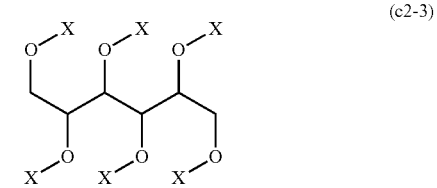

(c2-3)

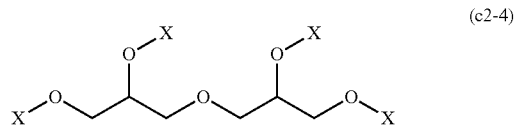

(c2-4)

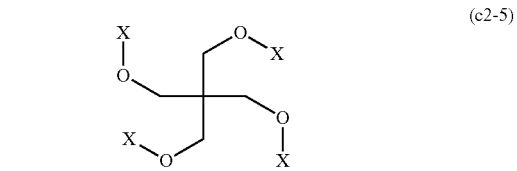

(c2-5)

(c2-6)

(c2-7)

(c2-8)

In General Formulas (c2-2) to (c2-8), the substituent X has the same meaning as in General Formula (c2), and a plurality of present X's may be the same or different.

In the present embodiment, the polyol compound (C) is 0.0005 to 1 part by weight with respect to 100 parts by weight of the compound (A) from the point of view of the effects of the present invention, preferably 0.0005 to 0.5 parts by weight, and more preferably 0.001 to 0.1 parts by weight.

[Ultraviolet Absorber (D)]

It is possible for the polymerizable composition for an optical material of the present embodiment to further include an ultraviolet absorber (D). Examples of the ultraviolet absorber (D) include a compound represented by General Formula (d). By using the ultraviolet absorber (D), it is possible to increase the effect of blocking light from harmful ultraviolet light to blue light of approximately 420 nm while maintaining the above effects, to reduce the influence of harmful light on the eyes, and to suppress problems such as eye fatigue and stress.

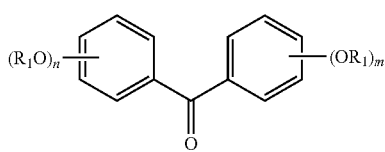

(d)

In General Formula (d), $R_1$ represents a hydrogen atom or a linear or branched alkyl group having 1 to 20 carbon atoms. A plurality of present $R_1$'s may be the same as each other or different.

$R_1$ is preferably a linear or branched alkyl group having 1 to 20 carbon atoms such as a hydrogen atom, a methyl group, an ethyl group, a propyl group, an isopropyl group, a butyl group, an isobutyl group, a sec-butyl group, a tert-butyl group, a pentyl group, a hexyl group, a heptyl group, an octyl group, a 2-ethylhexyl group, a nonyl group, and a decyl group, and particularly preferably a hydrogen atom, a methyl group, an ethyl group, and a propyl group.

m represents an integer of 1 to 5, preferably an integer of 1 to 3, n represents an integer of 1 to 5, preferably an integer of 1 to 3, and the sum of m and n represents an integer of 2 to 10, preferably an integer of 3 to 6.

Examples of such an ultraviolet absorber (D) include 2,2',4-trihydroxybenzophenone, 2,2'-dihydroxy-4-methoxybenzophenone, 2,2'-dihydroxy-4-ethoxybenzophenone, 2,2'-dihydroxy-4-n-propoxybenzophenone, 2,2'-dihydroxy-4-isopropoxybenzophenone, 2,2'-dihydroxy-4-n-butoxybenzophenone, 2,2'-dihydroxy-4-t-butoxybenzophenone, 2-hydroxy-4,4'-dimethoxybenzophenone, 2-hydroxy-4,4'-diethoxybenzophenone, 2-hydroxy-4,4'-di-n-propoxybenzophenone, 2-hydroxy-4,4'-diisopropoxybenzophenone, 2-hydroxy-4,4'-di-n-butoxybenzophenone, 2-hydroxy-4,4'-di-t-butoxybenzophenone, 2-hydroxy-4-methoxy-4'-ethoxybenzophenone, 2-hydroxy-4-methoxy-4'-n-propoxybenzophenone, 2-hydroxy-4-methoxy-4'-isopropoxybenzophenone, 2-hydroxy-4-methoxy-4'-n-butoxybenzophenone, 2-hydroxy-4-methoxy-4'-t-butoxybenzophenone, 2-hydroxy-4-ethoxy-4'-methoxybenzophenone, 2-hydroxy-4-ethoxy-4'-n-propoxybenzophenone, 2-hydroxy-4-ethoxy-4'-isopropoxybenzophenone, 2-hydroxy-4-ethoxy-4'-n-butoxybenzophenone, 2-hydroxy-4-ethoxy-4'-t-butoxybenzophenone, 2-hydroxy-4-n-propoxy-4'-methoxybenzophenone, 2-hydroxy-4-n-propoxy-4'-ethoxybenzophenone, 2-hydroxy-4-n-propoxy-4'-isopropoxybenzophenone, 2-hydroxy-4-n-propoxy-4'-n-butoxybenzophenone, 2-hydroxy-n-propoxy-4'-t-butoxybenzophenone, 2-hydroxy-4-isopropoxy-4'-methoxybenzophenone, 2-hydroxy-4-isopropoxy-4'-ethoxybenzophenone, 2-hydroxy-4-isopropoxy-4'-n-propoxybenzophenone, 2-hydroxy-4-isopropoxy-4'-n-butoxybenzophenone, 2-hydroxy-isopropoxy-4'-t-butoxybenzophenone, 2-hydroxy-4-n-butoxy-4'-methoxybenzophenone, 2-hydroxy-4-n-butoxy-4'-ethoxybenzophenone, 2-hydroxy-4-n-butoxy-4'-n-propoxybenzophenone, 2-hydroxy-4-n-butoxy-4'-isopropoxybenzophenone, 2-hydroxy-4-n-butoxy-4'-t-butoxybenzophenone, 2-hydroxy-4-t-butoxy-4'-methoxybenzophenone, 2-hydroxy-4-t-butoxy-4'-ethoxybenzophenone, 2-hydroxy-4-t-butoxy-4'-n-propoxybenzophenone, 2-hydroxy-4-t-butoxy-4'-isopropoxybenzophenone, 2-hydroxy-4-t-butoxy-4'-n-butoxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-di-n-propoxybenzophenone, 2,2'-dihydroxy-4,4'-di-isopropoxybenzophenone, 2,2'-dihydroxy-4,4'-di-n-butoxybenzophenone, 2,2'-dihydroxy-4,4'-di-t-butoxybenzophenone, 2,2'-dihydroxy-4-methoxy-4'-ethoxybenzophenone, 2,2'-dihydroxy-4-methoxy-4'-n-propoxybenzophenone, 2,2'-dihydroxy-4-methoxy-4'-isopropoxybenzophenone, 2,2'-dihydroxy-4-methoxy-4'-n-butoxybenzophenone, 2,2'-dihydroxy-4-methoxy-4'-t-butoxybenzophenone, 2,2'-dihydroxy-4-ethoxy-4'-n-propoxybenzophenone, 2,2'-dihydroxy-4-ethoxy-4'-isopropoxybenzophenone, 2,2'-dihydroxy-4-ethoxy-4'-n-butoxybenzophenone, 2,2'-dihydroxy-4-ethoxy-4'-t-butoxybenzophenone, 2,2'-dihydroxy-4-n-propoxy-4'- isopropoxybenzophenone, 2,2'-dihydroxy-4-n-propoxy-4'-n-butoxybenzophenone, 2,2'-dihydroxy-4-n-propoxy-4'-t-butoxybenzophenone, 2,2'-dihydroxy-4-isopropoxy-4'-n-butoxybenzophenone, 2,2'-dihydroxy-4-isopropoxy-4'-t-butoxybenzophenone, 2,2'-dihydroxy-4-n-butoxy-4'-t-butoxybenzophenone, 2,2',4-trimethoxybenzophenone, 2,2',4-triethoxybenzophenone, 2,2',4-tri-n-propoxybenzophenone, 2,2',4-triisopropoxybenzophenone, 2,2',5-trimethoxybenzophenone, 2,2',5-triethoxybenzophenone, 2,2',5-tri-n-propoxybenzophenone, 2,2',5-triisopropoxybenzophenone, 2,4,4'-trimethoxybenzophenone, 2,4,4'-triethoxybenzophenone, 2,4,4'-tri-n-propoxybenzophenone, 2,4,4'-triisopropoxybenzophenone, 3,4',5-trimethoxybenzophenone, 3,4',5-triethoxybenzophenone, 3,4',5-tri-n-propoxybenzophenone, 3,4',5-triisopropoxybenzophenone, 2,4-dimethoxy-4'-hydroxybenzophenone, 2,4-diethoxy-4'-hydroxybenzophenone, 2,4-di-n-propoxy-4'-hydroxybenzophenone, 2,4-diisopropoxy-4'-hydroxybenzophenone, 2,2',4,4'-tetramethoxybenzophenone, 2,2',4,4'-tetraethoxybenzophenone, 3,3'4,4'-tetramethoxybenzophenone, 3,3',4,4'-tetraethoxybenzophenone, 2,3,3',4'-tetramethoxybenzophenone, 2,3,3',4'-tetraethoxybenzophenone, and the like. Among these, 2,2'-dihydroxy-4-methoxybenzophenone, 2,2'-dihydroxy-4,4'-dimethoxybenzophenone, and 2,2',4,4'-tetrahydroxybenzophenone are particularly preferable.

[Dye (E)]

It is possible for the polymerizable composition for an optical material of the present embodiment to further include a dye (E). Examples of the dye (E) include anthraquinone-based dyes, perinone-based dyes, monoazo-based dyes, diazo-based dyes, phthalocyanine-based dyes, and the like, which may be used alone or in a combination of two or more.

It is possible to obtain an optical material excellent in transparency and appearance.

Examples of anthraquinone-based dyes include Solvent Blue 36 (1,4-bis(isopropylamino) anthracene-9,10-dione), Solvent Blue 63 (1-(methylamino)-4-(m-tolylamino) anthracene-9,10-dione), Solvent Blue 94 (1-amino-2-bromo-4-(phenylamino) anthracene-9,10-dione), Solvent Blue 97 (1,4-bis((2,6-diethyl-4-methylphenyl)amino) anthracene-9,10-dione), Solvent Blue 104 (1,4-bis(mesitylamino) anthracene-9,10-dione), Solvent Violet 13 (1-hydroxy-4-(p-tolylamino) anthracene-9,10-dione), Solvent Violet 13 (1,5-bis (p-tolylamino) anthracene-9,10-dione), Solvent Red 52 (3-methyl-6-(p-tolylamino)-3H-naphtho[1,2,3-de] quinoline-2,7-dione), Solvent Red 168 (1-(cyclohexylamino) anthracene-9,10-dione), Solvent Red 207 (1,5-bis(cyclohexylamino) anthracene-9,10-dione), Disperse Red 22 (1-(phenylamino) anthracene-9,10-dione), Disperse Red 60 (1-amino-4-hydroxy-2-phenoxy anthracene-9,10-dione), Solvent Violet 59 (1,4-diamino-2,3-diphenylanthracene-9,10-dione), Solvent Green 28 (1,4-bis((4-butylphenyl) amino)-5,8-dihydroxy anthracene-9,10-dione), and the like.

Examples of perinone-based dyes include Solvent Orange 60 (12H-isoindolo[2,1-a] perimidin-12-one), Solvent Orange 78, Solvent Orange 90, Solvent Red 135 (8,9,10,11-tetrachloro-12H-isoindolo[2,1-a] perimidin-12-one), Solvent Red 162, Solvent Red 179 (14H-benzo[4,5] isoquinolino[2,1-a] perimidin-14-one), and the like.

Examples of monoazo-based dyes include Solvent Red 195, Fast Orange R, Oil Red, Oil Yellow, and the like.

Examples of diazo-based dyes include Chicago Sky Blue 6B (Sodium6,6'-((1E,1'E)-(3,3'-dimethoxy-[1,1'-biphenyl]-4,4'-diyl) bis(diazene-2,1-diyl))bis(4-amino-5-hydroxynaphthalene-1,3-disulfonate)), Evans Blue (Sodium 6,6'-((1E,1'E)-(3,3'-dimethyl-[1,1'-biphenyl]-4,4'-diyl)bis (diaz ene-2,1-diyl))bis(4-amino-5-hydroxynaphthalene-1,3-disulfonate)), Direct Blue 15 (Sodium 3,3'-((1E,1'E)-(3,3'-dimethoxy-[1,1'-biphenyl]-4,4'-diyl)bis(diazene-2,1-diyl)) bis(5-amino-4-hydroxynaphthalene-2,7-disulfonate)), Trypan Blue (Sodium 3,3'-((1E,1'E)-(3,3'-dimethyl-[1,1'-biphenyl]-4,4'-diyl)bis(diazene-2,1-diyl))bis(5-amino-4-hydroxynaphthalene-2,7-disulfonate)), Benzopurpurin 4B (Sodium 3,3'-((1E,1'E)-(3,3'-dimethyl-[1,1'-biphenyl]-4,4'-diyl) bis(diazene-2,1-diyl))bis(4-aminonaphthalene-1-sulfonate)), Congo Red (Sodium 3,3'-((1E,1'E)-[1,1'-biphenyl]-4,4'-diylbis(diazene-2,1-diyl))bis(4-amino naphthalene-1-sulfonate)), and the like.

Examples of phthalocyanine-based dyes include C.I. Direct Blue 86, C.I. Direct Blue 199, and the like.

In the present embodiment, from the viewpoint of obtaining an optical material with an effect of blocking blue light at approximately 420 nm, Yellowness (YI), and excellent transparency, Solvent Blue 94, Solvent Blue 97, Solvent Blue 104, Solvent Violet 59, Solvent Red 195, Disperse Red 60, Solvent Green 28, and Solvent Orange 60 are preferable, and the above may be used alone or in a combination of two or more kinds.

Including the compound (A) including two or more allyloxycarbonyl groups, the radical polymerization initiator (B), and the modifier (C) in the polymerizable composition for an optical material of the present embodiment makes it possible to provide a polymerizable composition for an optical material which suppresses the occurrence of cracks during polymerization and breaking during releasing and which is excellent in productivity for a resin molded product. Furthermore, the polymerizable composition for an optical material is also excellent in optical properties such as refractive index and Abbe number.

As described above, in recent years, there is a problem in that the blue light included in natural light or the light emitted from liquid crystal displays of office equipment, displays of portable equipment such as smartphones or mobile phones, and the like has had an influence on the eyes, causing problems such as feelings of eye fatigue and pain and there is a demand to reduce the amount of exposure of the eyes to light from ultraviolet light to blue light having a relatively short wavelength of approximately 420 nm.

Here, in a diethylene glycol bisallyl carbonate polymer obtained by adding a benzophenone ultraviolet absorber to the diethylene glycol bisallyl carbonate polymer described in Patent Document 3 in an amount such that the light transmittance at a wavelength of 380 nm is 0% or more and the light transmittance at a wavelength of 440 nm is 90% or less and carrying out radical polymerization, it is possible to completely block ultraviolet light at a wavelength of 380 nm or less, but it is not disclosed that it is possible to block blue light having a comparatively short wavelength of approximately 420 nm.

In a case where the addition amount of the ultraviolet absorber is increased with respect to the compound including two or more allyloxycarbonyl groups in order to block blue light of approximately 420 nm, there are problems such as the color of the obtained resin deteriorating. In addition, in a case where the color deteriorates, there are methods for improving the color of the resin such as using a dye or the like; however, there are problems such as that, for example, the dye is decomposed by a peroxide compound used as a polymerization catalyst of polymerizable allyl carbonate and thus it is not possible to adjust the color of the resin well. In addition, there may be cases where the ultraviolet absorber is decomposed by the peroxide compound used as a polymerization catalyst of polymerizable allyl carbonate and the effect of blocking blue light of approximately 420 nm is not obtained.

In addition, in the polymerizable composition as described above, cracks may be occurred during polymerization or breaking may occur during releasing.

By including a specific ultraviolet absorber (D) and/or a dye (E) in addition to the components (A) to (C) in the polymerizable composition for an optical material of the present embodiment, the ultraviolet absorber (D) and the dye (E) are not decomposed while maintaining the above effects and it is also possible to increase the effect of blocking light from harmful ultraviolet light to blue light of approximately 420 nm, to reduce the influence of harmful light on eyes, to suppress problems such as eye fatigue and stress, and to obtain a resin having good color and transparency. From the viewpoint of the effect, it is preferable to include both component (D) and component (E).

Using the ultraviolet absorber (D) in an amount of 0.2 to 10 parts by weight with respect to 100 parts by weight of the compound (A) described above, preferably 0.5 to 3 parts by weight makes it possible to more efficiently exhibit the effect of blocking light from harmful ultraviolet light to blue light at approximately 420 nm.

Using the dye (E) in an amount of 0.1 to 100 ppm by weight with respect to 100 parts by weight of the compound (A), preferably 1 to 20 ppm by weight makes it possible to more efficiently exhibit the effect of blocking light from harmful ultraviolet light to blue light at approximately 420 nm.

[Other Components]

In the present embodiment, in addition to the components (A) to (E) described above, additives such as an internal release agent and a resin modifier may be further included.

As the internal release agent, it is possible to use an acidic phosphate ester or a nonreactive silicone oil. Examples of acidic phosphate esters include phosphoric monoesters and phosphoric diesters and it is possible to use the above alone or in a mixture of two or more kinds.

Examples of resin modifiers include a polyoxyalkylene alkyl ether compound, a polyoxyalkylene fatty acid ester, an episulfide compound, an alcohol compound other than the polyol compound represented by General Formula (c2), olefin compounds or the like including an amine compound, an epoxy compound, an organic acid and an anhydride thereof, a (meth)acrylate compound, and the like.

<Method for Producing Polymerizable Composition for Optical Material>

It is possible to prepare the polymerizable composition for an optical material of the present embodiment by mixing a compound (A) including two or more allyloxycarbonyl groups represented by General Formula (a), at least one kind of radical polymerization initiator (B) selected from the group consisting of a peroxyketal-based radical polymerization initiator, a peroxymonocarbonate-based radical polymerization initiator and peroxyester-based radical polymerization initiator, a modifier (C).

Furthermore, in a case of using an ultraviolet absorber (D) represented by General Formula (d) and/or at least one type of dye (E) selected from an anthraquinone dye, a perinone dye, a monoazo dye, a diazo dye, and a phthalocyanine dye, it is possible to prepare a polymerizable composition for an optical material by mixing the above together with component (A) to component (C).

In a case of mixing component (A) to component (C) as well as component (D) and/or component (E) to prepare a polymerizable composition, the temperature is usually 25° C. or lower. From the viewpoint of the pot life of the polymerizable composition, it may be preferable to further lower the temperature. However, in a case where the solubility of the catalyst, the internal release agent, and the additive in the monomer is not good, it is also possible to heat and dissolve the above in advance in the monomer and the resin modifier.

In the present embodiment, the method for producing the resin molded product is not particularly limited, but examples of preferable production methods include cast polymerization. First, a polymerizable composition is injected to a space in a forming mold held by a gasket, a tape, or the like. At this time, depending on the physical properties required for the plastic lens to be obtained, in many cases, it is preferable to carry out a defoaming treatment under reduced pressure, a filtration treatment such as pressurization and depressurization, and the like as necessary.

Since the polymerization conditions vary greatly depending on the composition of the polymerizable composition, the type and amount of the catalyst used, the shape of the mold, and the like, the conditions are not limited, but the above are performed for approximately 1 to 50 hours at a temperature of 0 to 150° C. In some cases, it is preferable to carry out the curing while held in a temperature range of 20 to 130° C., or gradually raising the temperature, for 1 to 48 hours.

The resin molded product may be subjected to a treatment such as annealing as necessary. The treatment temperature is usually performed at 50 to 150° C., but is preferably performed at 90 to 140° C., and more preferably performed at 100 to 130° C.

In the present embodiment, when molding the resin, in addition to the above-mentioned "other components", in accordance with the purpose, in the same manner as known molding methods, various additives such as a chain extender, a cross-linking agent, a light stabilizer, an antioxidant, oil soluble dye, filler, adhesion improver, and the like may be added thereto.

<Use>

It is possible to obtain the poly(allyl carbonate) and poly(allyl ester) resins obtained from the polymerizable composition for an optical material of the present embodiment as molded products of various shapes by changing the type of mold during cast polymerization.

The resin molded product of the present embodiment suppresses the occurrence of cracks during polymerization and breaking during releasing, and productivity is excellent. Including a specific ultraviolet absorber (D) and/or dye (E) in addition to the components (A) to (C) makes it possible to increase the effect of blocking light from harmful ultraviolet light to blue light of approximately 420 nm while maintaining the above effects and use is possible in various optical materials such as plastic lenses having an excellent transparent external appearance. In particular, it is possible to suitably use the resin molded product as a plastic spectacle lens.

[Plastic Spectacle Lens]

The plastic spectacle lens using the lens base material formed of the molded product of the present embodiment may be used after application of a coating layer on one surface or both surfaces thereof as necessary.

The plastic spectacle lens of the present embodiment includes a lens base material formed of the polymerizable composition described above and a coating layer.

Specific examples of the coating layer include a primer layer, a hard coating layer, an anti-reflection layer, an anti-fog coating layer, an anti-fouling layer, a water repellent layer, and the like. It is also possible to use each of these coating layers alone, or to use a plurality of coating layers in multiple layers. In a case of applying coating layers on both surfaces, the same coating layer may be applied to each side or different coating layers may be applied to each side.

In each of these coating layers, an infrared absorber for the purpose of protecting eyes from infrared light, a light stabilizer, an antioxidant, and a photochromic compound for the purpose of improving the weather resistance of the lens, and a dye or a pigment for the purpose of improving the fashionability of the lens, an antistatic agent, and other known additives for enhancing the performance of the lens may be used in combination.

Various leveling agents for the purpose of improving coatability may be used for layers to be coated by coating.

The primer layer is usually formed between a hard coating layer described below and a lens. The primer layer is a coating layer for the purpose of improving the adhesion between the hard coating layer formed thereon and the lens, and in some cases, it is also possible to improve the impact resistance. It is possible to use any material as the primer layer as long as the material has high adhesion to the obtained lens, but in general, a primer composition mainly formed of a urethane-based resin, an epoxy-based resin, a polyester-based resin, a melanin-based resin, a polyvinyl acetal, or the like is used. The primer composition may be used with an appropriate solvent which does not affect the lens, for the purpose of adjusting the viscosity of the composition. Naturally, the primer composition may be used without a solvent.

It is possible to form the primer layer by either a coating method or a drying method. In a case of using a coating method, a primer layer is formed by applying the primer composition to a lens by a known coating method such as spin coating, dip coating, or the like and then solidifying the primer composition. In a case where the drying method is used, the primer layer is formed by a known drying method such as a CVD method or a vacuum deposition method. When forming the primer layer, the surface of the lens may be subjected to a pretreatment such as an alkali treatment, a plasma treatment, an ultraviolet treatment, and the like as necessary for the purpose of improving the adhesion.

The hard coating layer is a coating layer for the purpose of imparting functions such as scratch resistance, abrasion resistance, moisture resistance, hot water resistance, heat resistance, weather resistance, and the like to the lens surface.

Generally, for the hard coating layer, a hard coat composition including an organosilicon compound having curability and one or more kinds of oxide fine particles of elements selected from the element group of Si, Al, Sn, Sb, Ta, Ce, La, Fe, Zn, W, Zr, In, and Ti and/or one kind or more of fine particles formed of composite oxides of two or more kinds of elements selected from this group of elements is used.

In addition to the above components, it is preferable for the hard coat composition to include at least one of amines, amino acids, metal acetylacetonate complexes, metal salts of organic acids, perchloric acids, salts of perchloric acids, acids, metal chlorides, and polyfunctional epoxy compounds. The hard coat composition may be used with an appropriate solvent which does not affect the lens or may be used without solvent.

The hard coating layer is usually formed by coating a hard coat composition by a known coating method such as spin coating or dip coating and then curing the composition. Examples of curing methods include heat curing and a method of curing by energy ray irradiation such as ultraviolet light or visible light. In order to suppress the occurrence of interference fringes, it is preferable that the difference in refractive index of the hard coating layer and the lens be within a range of ±0.1.

The anti-reflection layer is usually formed on the hard coating layer as necessary. There are organic type and inorganic type anti-reflection layers and, in the case of an inorganic type, inorganic oxides such as $SiO_2$ and $TiO_2$ are used, and the anti-reflection layer is formed by a drying method such as a vacuum deposition method, a sputtering method, an ion plating method, an ion beam assist method, or a CVD method. In the case of an organic type, the anti-reflection layer is formed by a wet process using a composition including an organosilicon compound and silica-based fine particles having an internal cavity.

There are single layer and multiple-layer anti-reflection layers, and in the case of use as a single layer, it is preferable that the refractive index be lower than the refractive index of the hard coating layer by at least 0.1. In order to effectively exhibit the anti-reflection function, it is preferable to form a multilayer anti-reflection film, in which case a low refractive index film and a high refractive index film are alternately laminated. Also in this case, the refractive index difference between the low refractive index film and the high refractive index film is preferably 0.1 or more. Examples of high refractive index films include films of $ZnO$, $TiO_2$, $CeO_2$, $Sb_2O_5$, $SnO_2$, $ZrO_2$, $Ta_2O_5$, and the like, and examples of low refractive index films include $SiO_2$ films and the like.

On the anti-reflection layer, an anti-fogging layer, an anti-fouling layer, a water repellent layer may be formed, as necessary. The method for forming the anti-fogging layer, the anti-fouling layer, and the water repellent layer is not particularly limited as long as there is no adverse effect on the anti-reflection function, the processing method, the processing material, and the like are not particularly limited and it is possible to use known anti-fogging treatment methods, anti-fouling treatment methods, water repellent treatment methods, and materials. Examples of anti-fogging treatment methods and anti-fouling treatment methods include a method of covering the surface with a surfactant, a method of adding a hydrophilic film to the surface to impart water absorbency, a method of covering the surface with fine irregularities to increase the water absorbency, a method of using photocatalytic activity to impart water absorbency, a method of carrying out a super water repellent treatment to prevent adhesion of water droplets, and the like. In addition, examples of water repellent treatment methods include a method of forming a water repellent treated layer by vapor deposition or sputtering of a fluorine-containing silane compound or the like, a method of dissolving the fluorine-containing silane compound in a solvent, followed by coating to form a water repellent treated layer, and the like.

EXAMPLES

A specific description will be given below of the present invention based on Examples A and B, but the present invention is not limited to these examples.

Example A

Evaluation of the molded product formed of the cured resin and the plastic lens was carried out by the following method.

In the present example, an adhesive tape was wound around the outer peripheries of two glass molds having the curved surfaces below and the polymerizable composition was cured and molded using molds (molds 1 to 4) assembled in parallel with a gap therebetween.

(Mold 1)
Base curve: convex surface: 6.00, concave surface: 6.00
Center thickness: 10 mm
Mold diameter: 81 mm
(Mold 2)
Base curve: convex surface: 6.25, concave surface: 6.25
Center thickness: 10 mm
Mold diameter: 75 mm
(Mold 3)
Base curve: convex surface: 4.25, concave surface: 6.25
Center thickness: 8 mm
Mold diameter: 75 mm
(Mold 4)
Base curve: convex surface: 0.00, concave surface: 0.00
Center thickness: 2 mm
Mold diameter: 75 mm

[Evaluation of Physical Properties]

(1) Occurrence of Cracks During Polymerization

In the present Example, a plurality of lenses were prepared, and lenses having cracks occurred at the edge portions during polymerization were rejected and evaluated according to the following pass criteria.

Pass rate 90% or more: A
Pass rate 50% or more, less than 90%: B
Pass rate less than 50%: C (2) Occurrence of Cracks During Releasing In the present Example, a plurality of lenses were prepared, and lenses having cracks occurred other than at the outer periphery of the lens during releasing were rejected and evaluated according to the following pass criteria.

Pass rate 90% or more: A
Pass rate 50% or more, less than 90%: B
Pass rate less than 50%: C (3) Light Cut-Off Rate at 420 nm Wavelength The transmittance of the obtained molded product (flat plate with a thickness of 2 mm) at a wavelength of 420 nm was measured with an ultraviolet-visible light spectrophotometer UV-1600 manufactured by Shimadzu Corporation, and the light cut-off rate at 420 nm defined by the below formula was calculated.

Light cut-off rate (%) at 420 nm wavelength=100 (%)−(transmittance at wavelength of 420 nm) (%)

In the Examples, the following components were used.
(Compound (A))
RAV 7 MC (poly(allyl carbonate) compound of diethylene glycol, neopentyl glycol, and pentaerythritol and oligomers thereof, produced by ACOMON)
(Radical Polymerization Initiator (B))
LUPEROX 531 M80 (80% solution of 1,1-bis(t-amylperoxy)cyclohexane, produced by Arkema Yoshitomi Ltd.)
(Siloxane Compound (C1))
A polyether-modified siloxane compound containing 68% by weight of the compound represented by General Formula (c1-1) and 29% by weight of the compound represented by General Formula (c1-2)

The molecular weight of the compound represented by General Formula (c1-1) is approximately 2000 and the molecular weight of the compound represented by General Formula (c1-2) is approximately 1,000.

In addition, in General Formula (c1-1), a+c=5 to 50, b=5 to 50, d=50 to 500, and e=5 to 50, and, in General Formula (c1-2), f+h=1 to 20, and g=1 to 10.

(Ultraviolet Absorber (D))
SEESORB 107 (2,2'-dihydroxy-4,4'-dimethoxybenzophenone, produced by Shipro Kasei Kaisha, Ltd.)
(Dye (E))
Plast Blue 8520 (Solvent Blue 94, produced by Arimoto Chemical Co., Ltd.)
Solvaperm Red BB (Solvent Red 195, produced by Clariant)

Example A1

With respect to 99.1 parts by weight of RAV 7MC (produced by Acomon), 0.75 parts by weight of SEESORB 107 (produced by Shipro Kasei Kaisha, Ltd.), 5 ppm of Plast Blue 8520 (produced by Arimoto Chemical Co., Ltd.), and 2.75 ppm of Solvaperm Red BB (produced by Clariant) were dissolved at 80° C., and, after cooling to room temperature, 0.8 parts by weight of LUPEROX 531 M80 (produced by Arkema Yoshitomi Ltd.) as a radical polymerization initiator and 0.1 parts by weight of the above polyether modified siloxane compound were added thereto, and, after degassing under reduced pressure, the mixture was injected into the mold 1 and the mold 4, and polymerization was carried out while gradually raising the temperature from 25° C. to 105° C. Then, after cooling to 60° C., the molded product was released from the mold. The 2 mm thick flat plate cured and molded with the mold 4 cut off the light at 420 nm by approximately 55% and the color was good and the transparency was high. Ten lenses were manufactured using the mold 1, and the occurrence of cracks during polymerization and the occurrence of cracks during releasing were evaluated. The results are shown in Table 1.

Example A2

With respect to 99.1 parts by weight of RAV 7MC (produced by Acomon), 0.75 parts by weight of SEESORB 107 (produced by Shipro Kasei Kaisha, Ltd.), 5 ppm of Plast Blue 8520 (produced by Arimoto Chemical Co., Ltd.), and 2.75 ppm of Solvaperm Red BB (produced by Clariant) were dissolved at 80° C., and, after cooling to room temperature, 0.8 parts by weight of LUPEROX 531 M80 (produced by Arkema Yoshitomi Ltd.) as a radical polymerization initiator and 0.1 parts by weight of the above polyether modified siloxane compound were added thereto, and, after degassing under reduced pressure, the mixture was injected into the mold 2 and the mold 4, and polymerization was carried out while gradually raising the temperature from 25° C. to 105° C. Then, after cooling to 60° C., the molded product was released from the mold. The 2 mm thick flat plate cured and molded with the mold 4 cut off the light at 420 nm by approximately 55% and the color was good and the transparency was high. Ten lenses were manufactured using the mold 2, and the occurrence of cracks during polymerization and breaking during releasing were evaluated. The results are shown in Table 1.

Example A3

With respect to 99.1 parts by weight of RAV 7MC (produced by Acomon), 0.75 parts by weight of SEESORB 107 (produced by Shipro Kasei Kaisha, Ltd.), 5 ppm of Plast Blue 8520 (produced by Arimoto Chemical Co., Ltd.), and 2.75 ppm of Solvaperm Red BB (produced by Clariant) were dissolved at 80° C., and, after cooling to room temperature, 0.8 parts by weight of LUPEROX 531 M80 (produced by Arkema Yoshitomi Ltd.) as a radical polymerization initiator and 0.1 parts by weight of the above polyether modified siloxane compound were added thereto, and, after degassing under reduced pressure, the mixture was injected into the mold 3 and the mold 4, and polymerization was carried out while gradually raising the temperature from 25° C. to 105° C. Then, after cooling to 60° C., the molded product was released from the mold. The 2 mm thick flat plate cured and molded with the mold 4 cut off the light at 420 nm by approximately 55% and the color was good and the transparency was high. Ten lenses were manufactured using the mold 3, and the occurrence of cracks during polymerization and breaking during releasing were evaluated. The results are shown in Table 1.

Comparative Example A1

With respect to 99.1 parts by weight of RAV 7MC (produced by Acomon), 0.75 parts by weight of SEESORB 107 (produced by Shipro Kasei Kaisha, Ltd.), 5 ppm of Plast Blue 8520 (produced by Arimoto Chemical Co., Ltd.), and 2.75 ppm of Solvaperm Red BB (produced by Clariant) were dissolved at 80° C., and, after cooling to room temperature, 0.8 parts by weight of LUPEROX 531 M80 (produced by Arkema Yoshitomi Ltd.) as a radical polymerization initiator was added thereto, and, after degassing under reduced pressure, the mixture was injected into the mold 1 and the mold 4, and polymerization was carried out while gradually raising the temperature from 25° C. to 105° C. Then, after cooling to 60° C., the molded product was released from the mold. The 2 mm thick flat plate cured and molded with the mold 4 cut off the light at 420 nm by approximately 55% and the color was good and the transparency was high. Ten lenses were manufactured using the mold 1, and the occurrence of cracks during polymerization and breaking during releasing were evaluated. The results are shown in Table 1.

Comparative Example A2

With respect to 99.1 parts by weight of RAV 7MC (produced by Acomon), 0.75 parts by weight of SEESORB 107 (produced by Shipro Kasei Kaisha, Ltd.), 5 ppm of Plast Blue 8520 (produced by Arimoto Chemical Co., Ltd.), and 2.75 ppm of Solvaperm Red BB (produced by Clariant) were dissolved at 80° C., and, after cooling to room temperature, 0.8 parts by weight of LUPEROX 531 M80 (produced by Arkema Yoshitomi Ltd.) as a radical polymerization initiator was added thereto, and, after degassing under reduced pressure, the mixture was injected into the mold 2 and the mold 4, and polymerization was carried out while gradually raising the temperature from 25° C. to 105° C. Then, after cooling to 60° C., the molded product was released from the mold. The 2 mm thick flat plate cured and molded with the mold 4 cut off the light at 420 nm by approximately 55% and the color was good and the transparency was high. Ten lenses were manufactured using the mold 2, and the occurrence of cracks during polymerization and breaking during releasing were evaluated. The results are shown in Table 1.

Comparative Example A3

With respect to 99.1 parts by weight of RAV 7MC (produced by Acomon), 0.75 parts by weight of SEESORB 107 (produced by Shipro Kasei Kaisha, Ltd.), 5 ppm of Plast Blue 8520 (produced by Arimoto Chemical Co., Ltd.), and 2.75 ppm of Solvaperm Red BB (produced by Clariant) were dissolved at 80° C., and, after cooling to room temperature, 0.8 parts by weight of LUPEROX 531 M80 (produced by Arkema Yoshitomi Ltd.) as a radical polymerization initiator was added thereto, and, after degassing under reduced pressure, the mixture was injected into the mold 3 and the mold 4, and polymerization was carried out while gradually raising the temperature from 25° C. to 105° C. Then, after cooling to 60° C., the molded product was released from the mold. The 2 mm thick flat plate cured and molded with the mold 4 cut off the light at 420 nm by approximately 55% and the color was good and the transparency was high. Ten lenses were manufactured using the mold 3, and the occurrence of cracks during polymerization and breaking during releasing were evaluated. The results are shown in Table 1.

TABLE 1

| | Siloxane compound addition amount [ppm] | No. of mold used | Edge portion cracks during polymerization | Lens cracks during releasing |
|---|---|---|---|---|
| Example A1 | 1000 | Mold 1 | B | A |
| Example A2 | 1000 | Mold 2 | A | A |
| Example A3 | 1000 | Mold 3 | A | A |
| Comparative Example A1 | 0 | Mold 1 | C | C |
| Comparative Example A2 | 0 | Mold 2 | A | C |
| Comparative Example A3 | 0 | Mold 3 | C | C |

Example B

Evaluation of the molded product formed of the cured resin and the plastic lens was carried out by the following method.

In the present example, an adhesive tape was wound around the outer peripheries of two glass molds having the curved surfaces below and the polymerizable composition was cured and molded using molds assembled in parallel with a gap therebetween.
(Mold 1)
Base curve: convex surface: 2.00, concave surface: 6.00
Center thickness: 10 mm
Mold diameter: 81 mm
(Mold 2)
Base curve: convex surface: 4.00, concave surface: 4.00
Center thickness: 2 mm
Mold diameter: 81 mm
[Evaluation of Physical Properties]
(1) Occurrence of Cracks During Polymerization
In the present Example, a plurality of lenses were prepared, and lenses having cracks occurred at the edge portions during polymerization were rejected and evaluated according to the following pass criteria.
Pass rate 80% or more: A
Pass rate 50% or more, less than 80%: B
Pass rate less than 50%: C
(2) Breaking During Releasing
In the present Example, a plurality of lenses were prepared and lenses in which breaking occurred other than at the outer peripheral portion of the lens during releasing were rejected and evaluated according to the following pass criteria.

Pass rate 90% or more: A
Pass rate 50% or more, less than 90%: B
Pass rate less than 50%: C
In the Examples, the following components were used.
(Polymerizable Compound (A))
RAV 7MC (poly(allyl carbonate) compound of diethylene glycol, neopentyl glycol, and pentaerythritol and oligomers thereof, produced by ACOMON)
(Radical Polymerization Initiator (B))
LUPEROX 531 M80 (80% solution of 1,1-bis(t-amylperoxy)cyclohexane, produced by Arkema Yoshitomi Ltd.)
(Polyol Compound (C2))
Polyethylene glycol, diol type, 600 (average molecular weight 600, produced by Wako Pure Chemical Industries, Ltd.)
Polypropylene glycol, diol type, 700 (average molecular weight 700, produced by Wako Pure Chemical Industries, Ltd.)
Polypropylene glycol, triol type, 700 (average molecular weight 700, produced by Wako Pure Chemical Industries, Ltd.)
Polypropylene glycol, diol type, 1000 (average molecular weight 1000, produced by Wako Pure Chemical Industries, Ltd.)
Polypropylene glycol, diol type, 2000 (average molecular weight 2000, produced by Wako Pure Chemical Industries, Ltd.)
Adeka Pluronic L-64 (polyoxyethylene-polyoxypropylene-polyoxyethylene block copolymer, produced by ADEKA)
(Ultraviolet Absorber (D))
SEESORB 107 (2,2'-dihydroxy-4,4'-dimethoxybenzophenone, produced by Shipro Kasei Kaisha, Ltd.)
(Dye (E))
Plast Blue 8520 (Solvent Blue 94, produced by Arimoto Chemical Co., Ltd.)
Solvaperm Red BB (Solvent Red 195, produced by Clariant)

Example B1

With respect to 100.0 parts by weight of RAV 7MC (produced by Acomon), 0.76 parts by weight of SEESORB 107 (produced by Shipro Kasei Kaisha, Ltd.), 5 ppm of Plast Blue 8520 (produced by Arimoto Chemical Co., Ltd.), and 2.77 ppm of Solvaperm Red BB (produced by Clariant) were dissolved at 80° C., and, after cooling to room temperature, 0.8 parts by weight of LUPEROX 531 M80 (produced by Arkema Yoshitomi Ltd.) as a radical polymerization initiator and 0.05 parts by weight of polypropylene glycol, diol type, 2000 (produced by Wako Pure Chemical Industries, Ltd.) were added thereto, and, after degassing under reduced pressure, the mixture was injected into the mold, and polymerization was carried out while gradually raising the temperature from 25° C. to 105° C. Then, after cooling to 60° C., the molded product was released from the mold. Table 2 shows the evaluation results of the occurrence of cracks during polymerization and breaking during releasing of the lens molded by the mold 1 and the lens molded by the mold 2. Each lens was transparent and excellent in appearance.

Example B2

With respect to 100.0 parts by weight of RAV 7MC (produced by Acomon), 0.76 parts by weight of SEESORB 107 (produced by Shipro Kasei Kaisha, Ltd.), 5 ppm of Plast Blue 8520 (produced by Arimoto Chemical Co., Ltd.), and 2.77 ppm of Solvaperm Red BB (produced by Clariant) were dissolved at 80° C., and, after cooling to room temperature, 0.8 parts by weight of LUPEROX 531 M80 (produced by Arkema Yoshitomi Ltd.) as a radical polymerization initiator and 0.05 parts by weight of polypropylene glycol, diol type, 1000 (produced by Wako Pure Chemical Industries, Ltd.) were added thereto, and, after degassing under reduced pressure, the mixture was injected into the mold, and polymerization was carried out while gradually raising the temperature from 25° C. to 105° C. Then, after cooling to 60° C., the molded product was released from the mold. Table 2 shows the evaluation results of the occurrence of cracks during polymerization and breaking during releasing of the lens molded by the mold 1 and the lens molded by the mold 2. Each lens was transparent and excellent in appearance.

Example B3

With respect to 100.0 parts by weight of RAV 7MC (produced by Acomon), 0.76 parts by weight of SEESORB 107 (produced by Shipro Kasei Kaisha, Ltd.), 5 ppm of Plast Blue 8520 (produced by Arimoto Chemical Co., Ltd.), and 2.77 ppm of Solvaperm Red BB (produced by Clariant) were dissolved at 80° C., and, after cooling to room temperature, and 0.05 parts by weight of LUPEROX 531 M80 (produced by Arkema Yoshitomi Ltd.) as a radical polymerization initiator and 0.8 parts by weight of polypropylene glycol, diol type, 700 (produced by Wako Pure Chemical Industries, Ltd.) were added thereto, and, after degassing under reduced pressure, the mixture was injected into the mold, and polymerization was carried out while gradually raising the temperature from 25° C. to 105° C. Then, after cooling to 60° C., the molded product was released from the mold. Table 2 shows the evaluation results of the occurrence of cracks during polymerization and breaking during releasing of the lens molded by the mold 1 and the lens molded by the mold 2. Each lens was transparent and excellent in appearance.

Example B4

With respect to 100.0 parts by weight of RAV 7MC (produced by Acomon), 0.76 parts by weight of SEESORB 107 (produced by Shipro Kasei Kaisha, Ltd.), 5 ppm of Plast Blue 8520 (produced by Arimoto Chemical Co., Ltd.), and 2.77 ppm of Solvaperm Red BB (produced by Clariant) were dissolved at 80° C., and, after cooling to room temperature, 0.8 parts by weight of LUPEROX 531 M80 (produced by Arkema Yoshitomi Ltd.) as a radical polymerization initiator and 0.05 parts by weight of polypropylene glycol, triol type, 700 (produced by Wako Pure Chemical Industries, Ltd.) were added thereto, and, after degassing under reduced pressure, the mixture was injected into the mold, and polymerization was carried out while gradually raising the temperature from 25° C. to 105° C. Then, after cooling to 60° C., the molded product was released from the mold. Table 2 shows the evaluation results of the occurrence of cracks during polymerization and breaking during releasing of the lens molded by the mold 1 and the lens molded by the mold 2. Each lens was transparent and excellent in appearance.

Example B5

With respect to 100.0 parts by weight of RAV 7MC (produced by Acomon), 0.76 parts by weight of SEESORB 107 (produced by Shipro Kasei Kaisha, Ltd.), 5 ppm of Plast Blue 8520 (produced by Arimoto Chemical Co., Ltd.), and 2.77 ppm of Solvaperm Red BB (produced by Clariant) were dissolved at 80° C., and, after cooling to room temperature, 0.8 parts by weight of LUPEROX 531 M80 (produced by Arkema Yoshitomi Ltd.) as a radical polymerization initiator and 0.05 parts by weight of polyethylene glycol, diol type, 600 (produced by Wako Pure Chemical Industries, Ltd.) were added thereto, and, after degassing under reduced pressure, the mixture was injected into the mold, and polymerization was carried out while gradually raising the temperature from 25° C. to 105° C. Then, after cooling to 60° C., the molded product was released from the mold. Table 2 shows the evaluation results of the occurrence of cracks during polymerization and breaking during releasing of the lens molded by the mold 1 and the lens molded by the mold 2. Each lens was transparent and excellent in appearance.

Example B6

With respect to 100.0 parts by weight of RAV 7MC (produced by Acomon), 0.76 parts by weight of SEESORB 107 (produced by Shipro Kasei Kaisha, Ltd.), 5 ppm of Plast Blue 8520 (produced by Arimoto Chemical Co., Ltd.), and 2.77 ppm of Solvaperm Red BB (produced by Clariant) were dissolved at 80° C., and, after cooling to room temperature, 0.8 parts by weight of LUPEROX 531 M80 (produced by Arkema Yoshitomi Ltd.) as a radical polymerization initiator and 0.05 parts by weight of ADEKA PLURONIC L-64 (produced by ADEKA) were added thereto, and, after degassing under reduced pressure, the mixture was injected into the mold, and polymerization was carried out while gradually raising the temperature from 25° C. to 105° C. Then, after cooling to 60° C., the molded product was released from the mold. Table 2 shows the evaluation results of the occurrence of cracks during polymerization and breaking during releasing of the lens molded by the mold 1 and the lens molded by the mold 2. Each lens was transparent and excellent in appearance.

Comparative Example B1

With respect to 100.0 parts by weight of RAV 7MC (produced by Acomon), 0.76 parts by weight of SEESORB 107 (produced by Shipro Kasei Kaisha, Ltd.), 5 ppm of Plast Blue 8520 (produced by Arimoto Chemical Co., Ltd.), and 2.77 ppm of Solvaperm Red BB (produced by Clariant) were dissolved at 80° C., and, after cooling to room temperature, 0.8 parts by weight of LUPEROX 531 M80 (produced by Arkema Yoshitomi Ltd.) as a radical polymerization initiator was added thereto, and, after degassing under reduced pressure, the mixture was injected into the mold, and polymerization was carried out for 43 hours while gradually raising the temperature from room temperature to 105° C. Then, after cooling to 60° C., the molded product was released from the mold. Table 2 shows the evaluation results of the occurrence of cracks during polymerization and breaking during releasing of the lens molded by the mold 1 and the lens molded by the mold 2.

TABLE 2

| | Polyol compound | | Lens formed in mold 1 | | Lens formed in mold 2 | |
| --- | --- | --- | --- | --- | --- | --- |
| | Name | Addition amount [ppm] | Cracks during curing | Cracks during releasing | Cracks during curing | Cracks during releasing |
| Example B1 | PPG, diol type, 2000 | 500 | A | A | A | A |
| Example B2 | PPG, diol type, 1000 | 500 | A | A | A | A |
| Example B3 | PPG, diol type, 700 | 500 | A | A | A | B |
| Example B4 | PPG, triol type, 700 | 500 | A | A | A | A |
| Example B5 | PEG, diol type, 600 | 500 | A | A | A | A |
| Example B6 | Adeka Pluronic L-64 | 500 | A | A | A | A |
| Comparative Example B1 | — | 0 | C | B | A | C |

This application claims priority based on Japanese patent application No. 2017-030270 filed on Feb. 21, 2017 and claims priority based on Japanese patent application No. 2017-118598 filed on Jun. 16, 2017, and all of the disclosures are incorporated herein.

The invention claimed is:

1. A polymerizable composition for an optical material, comprising:
a compound (A) represented by General Formula (a) and including two or more allyloxycarbonyl groups;
at least one kind of radical polymerization initiator (B) selected from the group consisting of a peroxyketal-based radical polymerization initiator, a peroxymonocarbonate-based radical polymerization initiator, and a peroxyester-based radical polymerization initiator;
at least one kind of dye (E) selected from the group consisting of an anthraquinone-based dye, a perinone-based dye, a monoazo-based dye, and a diazo-based dye; and
a modifier (C) selected from a polyether modified siloxane compound represented by General Formula (c1) or a polyol compound represented by General Formula (c2),

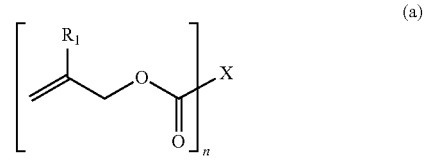
(a)

wherein in General Formula (a), n represents an integer of 2 to 6, $R_1$ represents a hydrogen atom or a methyl group, a plurality of present $R_1$'s may be the same or different, X is a divalent to hexavalent organic group a derived from a linear or branched aliphatic polyol having 3 to 12 carbon atoms which optionally have an oxygen atom, a divalent to hexavalent organic group b derived from an alicyclic polyol having 5 to 16 carbon atoms which optionally have an oxygen atom, or a divalent to hexavalent organic group c derived from an aromatic compound having 6 to 12 carbon atoms, and the organic group a or the organic group b forms an allyl carbonate group by bonding to an allyloxycarbonyl group via an oxygen atom derived from a hydroxyl group provided in these groups,

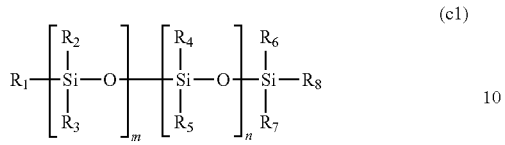
(c1)

wherein in General Formula (c1), $R_1$ to $R_8$ may be the same or different, and at least one of $R_1$ to $R_8$ represents a polyether group represented by General Formula (c1a), and other $R_1$ to $R_8$ may be the same or different and represent a linear or branched alkyl group having 1 to 20 carbon atoms, a linear or branched alkoxy group having 1 to 20 carbon atoms, a hydroxyl group, or a polysiloxy group, the plurality of present $R_2$ to $R_5$ may be the same as each other or different, m and n may be the same or different and represent an integer of 0 or more,

(c1a)

wherein in General Formula (c1a), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms, a plurality of present $R_{25}$'s may be the same or different, k represents an integer of 1 or more, and

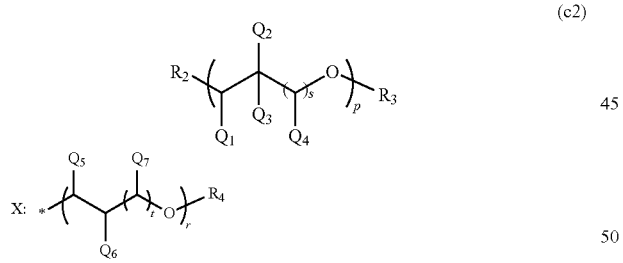
(c2)

wherein in General Formula (c2), $R_2$ represents a hydroxyl group, an —OX group, or a linear or branched alkyl group having 1 to 4 carbon atoms, $R_3$ represents a hydrogen atom, an X group, or a linear or branched alkyl group having 1 to 4 carbon atoms, $R_4$ represents a hydrogen atom or a linear or branched alkyl group having 1 to 4 carbon atoms, $Q_1$ to $Q_7$ each independently represent a hydrogen atom, a linear or branched alkyl group having 1 to 4 carbon atoms, a —CH$_2$—OX group, or an —OX group, p represents an integer of 1 to 4, s represents an integer of 0 to 4, t represents an integer of 0 to 4, and r represents an integer of 1 to 1,000, a plurality of present $Q_1$ to $Q_7$, X, s, and t may be the same or different, and * represents a bonding hand.

2. The polymerizable composition for an optical material according to claim 1, further comprising:

an ultraviolet absorber (D) represented by General Formula (d),

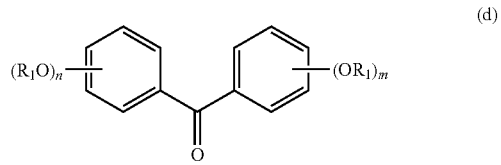
(d)

wherein in General Formula (d), $R_1$ represents a hydrogen atom or a linear or branched alkyl group having 1 to 20 carbon atoms, a plurality of present $R_1$'s may be the same or different, m represents an integer of 1 to 3, n represents an integer of 1 to 3, and the sum of m and n represents an integer of 3 to 6.

3. The polymerizable composition for an optical material according to claim 2, wherein the ultraviolet absorber (D) is 2,2'-dihydroxy-4-methoxybenzophenone, 2,2',4,4'-tetrahydroxybenzophenone, or 2,2'-dihydroxy-4,4'-dimethoxybenzophenone.

4. The polymerizable composition for an optical material according to claim 1, wherein the compound (A) including two or more allyloxycarbonyl groups includes an allyl carbonate polymerizable compound (A1) represented by General Formula (a1) and an oligomer thereof, an allyl ester polymerizable compound (A2) represented by General Formula (a2-1) or (a2-2) and an oligomer thereof, or a polymerizable compound (A3) represented by General Formula (a3) and including at least one of an allyl ester group and an allyl carbonate group and an oligomer thereof,

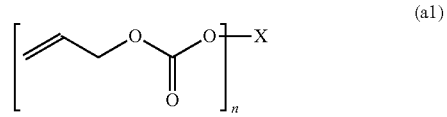
(a1)

wherein in General Formula (a1), X represents a divalent to hexavalent group derived from a linear or branched aliphatic polyol having 3 to 12 carbon atoms or a divalent to hexavalent group derived from an alicyclic polyol having 5 to 16 carbon atoms, and n represents an integer of 2 to 6,

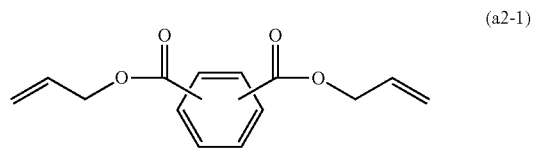
(a2-1)

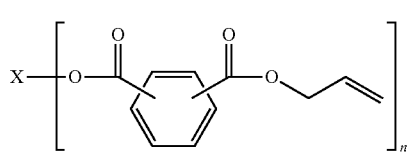

wherein in General Formula (a2-2), X represents a divalent group derived from a linear or branched aliphatic diol having 2 to 8 carbon atoms, a trivalent to hexavalent group derived from a linear or branched aliphatic polyol having 3 to 10 carbon atoms and having 3 to 6 hydroxyl groups, and n represents an integer of 2 to 6, and

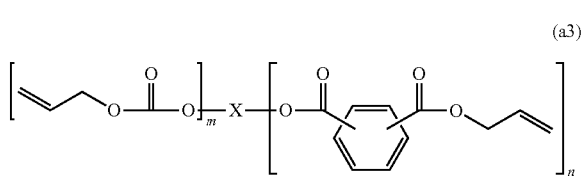

wherein in General Formula (a3), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, m and n represent integers of 0 to 6, and a sum of m and n represents an integer of 2 to 6.

5. The polymerizable composition for an optical material according to claim 4,
wherein the allyl carbonate polymerizable compound (A1) includes at least one kind selected from
a bis(allyl carbonate) compound of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$] tricyclodecane,
a tris(allyl carbonate) compound of at least one kind of triol selected from glycerol, trimethylolpropane, and tris(hydroxyethyl) isocyanurate,
a tetra(allyl carbonate) compound of at least one kind of tetraol selected from pentaerythritol, diglycerol, and ditrimethylol propane,
a dipentaerythritol hexa(allyl carbonate) compound, and
a mixed poly(allyl carbonate) compound of at least two kinds of compounds selected from the diols, the triols, the tetraols, and the dipentaerythritol.

6. The polymerizable composition for an optical material according to claim 4,
wherein the allyl carbonate polymerizable compound (A1) includes at least one kind selected from
(i) a mixture of a diethylene glycol bis(allyl carbonate) compound and an oligomer thereof,
(ii) a mixture of a bis(allyl carbonate) compound of a mixture of diethylene glycol and neopentyl glycol and an oligomer thereof,
(iii) a mixture of a poly(allyl carbonate) compound of a mixture of diethylene glycol and tris(hydroxyethyl) isocyanurate and an oligomer thereof,
(iv) a mixture of a poly(allyl carbonate) compound of a mixture of diethylene glycol and trimethylolpropane and an oligomer thereof,
(v) a mixture of a poly(allyl carbonate) compound of a mixture of diethylene glycol and pentaerythritol and an oligomer thereof,
(vi) a mixture of a poly(allyl carbonate) compound of a mixture of diethylene glycol, neopentyl glycol and pentaerythritol and an oligomer thereof, and
(vii) a poly(allyl carbonate) mixture comprising a mixture of a poly(allyl carbonate) compound of a mixture of diethylene glycol, neopentyl glycol, and pentaerythritol and an oligomer thereof, and a mixture of a diethylene glycol bis(allyl carbonate) compound and an oligomer thereof.

7. The polymerizable composition for an optical material according to claim 4,
wherein the allyl ester polymerizable compound (A2) or the polymerizable compound (A3) includes at least one kind selected from
a diallyl phthalate compound selected from diallyl isophthalate, diallyl terephthalate and diallyl orthophthalate,
a diallyl ester compound obtained by transesterification reaction of the diallyl phthalate compound and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane, and an oligomer thereof,
a polyallyl ester compound obtained by transesterification reaction of the diallyl phthalate compound and a mixture of at least one kind of polyol selected from glycerol, trimethylolpropane, tris(hydroxyethyl)isocyanurate, pentaerythritol, diglycerol, ditrimethylolpropane, and dipentaerythritol, and an oligomer thereof, and
an allyl ester compound, an allyl carbonate compound, and a compound having an allyl carbonate group and an allyl ester group, obtained by transesterification reaction of a mixture of at least one kind of dialkyl phthalate selected from dialkyl isophthalate having an alkyl group having 1 to 3 carbon atoms, dialkyl terephthalate, and dialkyl orthophthalate, allyl alcohol, diallyl carbonate, and the diols or the polyols, and oligomers thereof.

8. The polymerizable composition for an optical material according to claim 4,
wherein the allyl ester polymerizable compound (A2) or the polymerizable compound (A3) includes at least one kind selected from
(i) a mixture of diallyl terephthalate and a diethylene glycol bis(allyl carbonate) compound at 30% by weight with respect to the diallyl terephthalate and an oligomer thereof,
(ii) an allyl ester compound obtained by transesterification reaction of a mixture of diallyl terephthalate and propylene glycol,
(iii) a mixture of the allyl ester compound of (ii) and a diethylene glycol bis(allyl carbonate) compound at 20% by weight with respect to the allyl ester compound and an oligomer thereof,
(iv) a mixture of an allyl ester compound, an allyl carbonate compound, and a compound having an allyl ester group and an allyl carbonate group, obtained by transesterification reaction of a mixture of dimethyl terephthalate, allyl alcohol, diallyl carbonate, and diethylene glycol, and (v) a mixture of the mixture obtained in (iv) and a diethylene glycol bis(allyl carbonate) compound at 10% by weight with respect to the mixture and an oligomer thereof.

9. The polymerizable composition for an optical material according to claim 4, wherein the compound (A) including two or more allyloxycarbonyl groups is a mixture of the allyl ester polymerizable compound (A2) and/or the polymerizable compound (A3) wherein the polymerizable compound (A3) includes at least one kind selected from a diallyl phthalate compound selected from diallyl isophthalate, diallyl terephthalate and diallyl orthophthalate, a diallyl ester compound obtained by transesterification reaction of the diallyl phthalate compound and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane, and an oligomer thereof, a polyallyl ester compound obtained by transesterification reaction of the diallyl phthalate compound and a mixture of at least one kind of polyol selected from glycerol, trimethylolpropane, tris(hydroxyethyl)isocyanurate, pentaerythritol, diglycerol, ditrimethylolpropane, and dipentaerythritol, and an oligomer thereof, and an allyl ester compound, an allyl carbonate compound, and a compound having an allyl carbonate group and an allyl ester group, obtained by transesterification reaction of a mixture of at least one kind of dialkyl phthalate selected from dialkyl isophthalate having an alkyl group having 1 to 3 carbon atoms, dialkyl terephthalate, and dialkyl orthophthalate, allyl alcohol, diallyl carbonate, and the diols or the polyols, and oligomers thereof, and the allyl carbonate polymerizable compound (A1) includes at least one kind selected from a bis(allyl carbonate) compound of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$] tricyclodecane, a tris(allyl carbonate) compound of at least one kind of triol selected from glycerol, trimethylolpropane, and tris(hydroxyethyl) isocyanurate, a tetra(allyl carbonate) compound of at least one kind of tetraol selected from pentaerythritol, diglycerol, and ditrimethylol propane, a dipentaerythritol hexa(allyl carbonate) compound, and a mixed poly(allyl carbonate) compound of at least two kinds of compounds selected from the diols, the triols, the tetraols, and the dipentaerythritol, and an oligomer thereof.

10. The polymerizable composition for an optical material according to claim 1, wherein the radical polymerization initiator (B) is at least one kind selected from the group consisting of a peroxyketal-based polymerization initiator represented by General Formula (b1) having a 10-hour half-life temperature of 80° C. or higher, a peroxymonocarbonate-based polymerization initiator represented by General Formula (b2) having a 10-hour half-life temperature of 80° C. or higher, and a peroxyester-based polymerization initiator represented by General Formula (b3) having a 10-hour half-life temperature of 65° C. or higher,

(b1)

wherein in General Formula (b1), $R_3$ is a tertiary alkyl group, $R_1$ and $R_2$ are each independently an alkyl group selected from methyl, ethyl, propyl, and butyl, and the alkyl group may have an alkyl ester group at a terminal of a chain, or $R_1$ and $R_2$ may form a cycloalkylene group together with carbon atoms bonded thereto, and the cycloalkylene group may have 1 to 3 alkyl substituents,

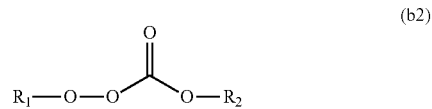

(b2)

wherein in General Formula (b2), $R_1$ is a tertiary alkyl group having 3 to 6 carbon atoms, and $R_2$ is a linear or branched alkyl group having 3 to 8 carbon atoms, and

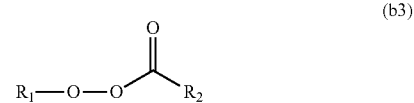

(b3)

wherein in General Formula (b3), $R_1$ is a tertiary alkyl group having 3 to 6 carbon atoms, and $R_2$ is a linear or branched alkyl group having 3 to 9 carbon atoms or a phenyl group.

11. The polymerizable composition for an optical material according to claim 1, wherein $R_{26}$ of the polyether group represented by General Formula (c1a) is a hydrogen atom or a linear or branched alkyl group having 1 to 20 carbon atoms.

12. The polymerizable composition for an optical material according to claim 1, wherein $R_{26}$ of the polyether group represented by General Formula (c1a) is a linear or branched alkenyl group having 2 to 20 carbon atoms or a linear or branched alkynyl group having 2 to 20 carbon atoms.

13. A molded product obtained by curing the polymerizable composition for an optical material according to claim 1.

14. An optical material comprising the molded product according to claim 13.

15. A plastic lens comprising the molded product according to claim 13.

16. A method for manufacturing a plastic lens, comprising:
a step of preparing a polymerizable composition for an optical material by mixing
a compound (A) represented by General Formula (a) and including two or more allyloxycarbonyl groups,
at least one kind of radical polymerization initiator (B) selected from the group consisting of a peroxyketal-based radical polymerization initiator, a peroxymonocarbonate-based radical polymerization initiator, and a peroxyester-based radical polymerization initiator,
at least one kind of dye (E) selected from the group consisting of an anthraquinone-based dye, a perinone-based dye, a monoazo-based dye, and a diazo-based dye, and
a modifier (C) selected from a polyether modified siloxane compound represented by General Formula (c1) or a polyol compound represented by General Formula (c2), and
a step of casting and polymerizing the polymerizable composition for an optical material to form a lens base material,

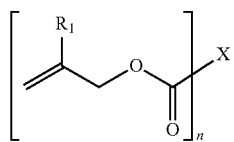

(a)

wherein in General Formula (a), n represents an integer of 2 to 6, $R_1$ represents a hydrogen atom or a methyl group, a plurality of present $R_1$'s may be the same or different, X is a divalent to hexavalent organic group a derived from a linear or branched aliphatic polyol having 3 to 12 carbon atoms which optionally have an oxygen atom, a divalent to hexavalent organic group b derived from an alicyclic polyol having 5 to 16 carbon atoms which optionally have an oxygen atom, or a divalent to hexavalent organic group c derived from an aromatic compound having 6 to 12 carbon atoms, and the organic group a or the organic group b forms an allyl carbonate group by bonding to an allyloxycarbonyl group via an oxygen atom derived from a hydroxyl group provided in these groups,

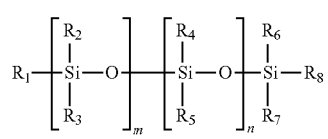

(c1)

wherein in General Formula (c1), $R_1$ to $R_8$ may be the same or different, and at least one of $R_1$ to $R_8$ represents a polyether group represented by General Formula (c1a), and other $R_1$ to $R_8$ may be the same or different and represent a linear or branched alkyl group having 1 to 20 carbon atoms, a linear or branched alkoxy group having 1 to 20 carbon atoms, a hydroxyl group, or a polysiloxy group, the plurality of present $R_2$ to $R_5$ may be the same as each other or different, m and n may be the same or different and represent an integer of 0 or more,

(c1a)

wherein in General Formula (c1a), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms, a plurality of present $R_{25}$'s may be the same or different, k represents an integer of 1 or more, and

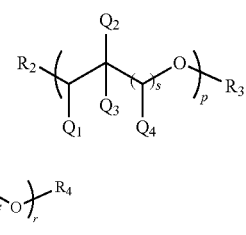

(c2)

wherein in General Formula (c2), $R_2$ represents a hydroxyl group, an —OX group, or a linear or branched alkyl group having 1 to 4 carbon atoms, $R_3$ represents a hydrogen atom, an X group, or a linear or branched alkyl group having 1 to 4 carbon atoms, $R_4$ represents a hydrogen atom or a linear or branched alkyl group having 1 to 4 carbon atoms, $Q_1$ to $Q_7$ each independently represent a hydrogen atom, a linear or branched alkyl group having 1 to 4 carbon atoms, a —CH$_2$—OX group, or an —OX group, p represents an integer of 1 to 4, s represents an integer of 0 to 4, t represents an integer of 0 to 4, and r represents an integer of 1 to 1,000, a plurality of present $Q_1$ to $Q_7$, X, s, and t may be the same or different, and * represents a bonding hand.

17. The method for manufacturing a plastic lens according to claim 16,
wherein the step of preparing the polymerizable composition for an optical material is a step of preparing a polymerizable composition for an optical material by further mixing an ultraviolet absorber (D) represented by General Formula (d), and

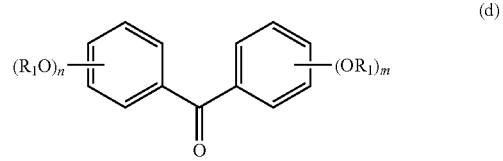

(d)

wherein in General Formula (d), $R_1$ represents a hydrogen atom or a linear or branched alkyl group having 1 to 20 carbon atoms, a plurality of present $R_1$'s may be the same or different, m represents an integer of 1 to 3, n represents an integer of 1 to 3, and the sum of m and n represents an integer of 3 to 6.

* * * * *